US012563262B2

(12) United States Patent
Fogg et al.

(10) Patent No.: US 12,563,262 B2
(45) Date of Patent: Feb. 24, 2026

(54) MEDIA SYSTEM WITH PRESENTATION AREA DATA ANALYSIS AND SEGMENT INSERTION FEATURE

(71) Applicant: Roku, Inc., San Jose, CA (US)

(72) Inventors: Andrew Peter Fogg, Los Gatos, CA (US); Sunil Ramesh, Cupertino, CA (US); Michael Cutter, Golden, CO (US); Greg Garner, Key Colony Beach, FL (US); Karthick Narayanan, Cambridge (GB); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/502,721

(22) Filed: Nov. 6, 2023

(65) Prior Publication Data

US 2025/0150670 A1     May 8, 2025

Related U.S. Application Data

(63) Continuation-in-part of application No. 18/340,811, filed on Jun. 23, 2023, now Pat. No. 11,949,965.

(51) Int. Cl.
| | |
|---|---|
| *H04N 21/44* | (2011.01) |
| *H04N 21/442* | (2011.01) |
| *H04N 21/458* | (2011.01) |
| *H04N 21/81* | (2011.01) |

(52) U.S. Cl.
CPC . *H04N 21/44016* (2013.01); *H04N 21/44008* (2013.01); *H04N 21/44218* (2013.01); *H04N 21/458* (2013.01); *H04N 21/812* (2013.01)

(58) Field of Classification Search
CPC ....... H04N 21/44016; H04N 21/44008; H04N 21/44218; H04N 21/458; H04N 21/812
See application file for complete search history.

(56) References Cited

U.S. PATENT DOCUMENTS

| | | | |
|---|---|---|---|
| 9,361,005 B2 | 6/2016 | Wheatley | |
| 9,363,569 B1 * | 6/2016 | van Hoff | H04N 13/271 |
| 10,051,326 B2 | 8/2018 | Maughan | |
| 10,469,916 B1 * | 11/2019 | Teller | H04N 21/812 |

(Continued)

FOREIGN PATENT DOCUMENTS

WO     2009033187 A1     3/2009

*Primary Examiner* — Timothy R Newlin
(74) *Attorney, Agent, or Firm* — McDonnell Boehnen Hulbert & Berghoff LLP

(57) ABSTRACT

In one aspect, disclosed is an example method for use in connection with a media-presentation device presenting a media program via a display screen of the media-presentation device, the method including: (i) during presentation of a temporal portion of the media program, identifying an audience engagement region of presented content, wherein the identified audience engagement region is less than an entirety of a display area that corresponds to the display screen; (ii) using at least the identified audience engagement region as a basis to select a media segment from among multiple candidate media segments; (iii) identifying an upcoming media segment insertion point within the media program; and (iv) facilitating the media-presentation device inserting, at the identified media segment insertion point within the media program, the selected media segment.

18 Claims, 9 Drawing Sheets

(56) References Cited

U.S. PATENT DOCUMENTS

| | | | |
|---|---|---|---|
| 2009/0273711 A1* | 11/2009 | Chapdelaine | G11B 27/34 |
| | | | 348/E7.001 |
| 2009/0284601 A1* | 11/2009 | Eledath | G06T 7/215 |
| | | | 375/E7.076 |
| 2012/0069897 A1* | 3/2012 | Anselmo | H04N 19/80 |
| | | | 348/700 |
| 2013/0106844 A1* | 5/2013 | Hong | H04N 13/128 |
| | | | 345/419 |
| 2013/0247081 A1 | 9/2013 | Vinson | |
| 2013/0322524 A1* | 12/2013 | Jang | H04N 19/167 |
| | | | 375/240.03 |
| 2014/0047464 A1 | 2/2014 | Lev | |
| 2015/0185993 A1 | 7/2015 | Wheatley | |
| 2016/0231246 A1* | 8/2016 | Chu | G01N 21/6456 |
| 2018/0218224 A1* | 8/2018 | Olmstead | G07G 1/0045 |
| 2020/0045363 A1* | 2/2020 | Nellore | H04N 21/812 |
| 2021/0334846 A1* | 10/2021 | Begeja | G06Q 30/0275 |

* cited by examiner

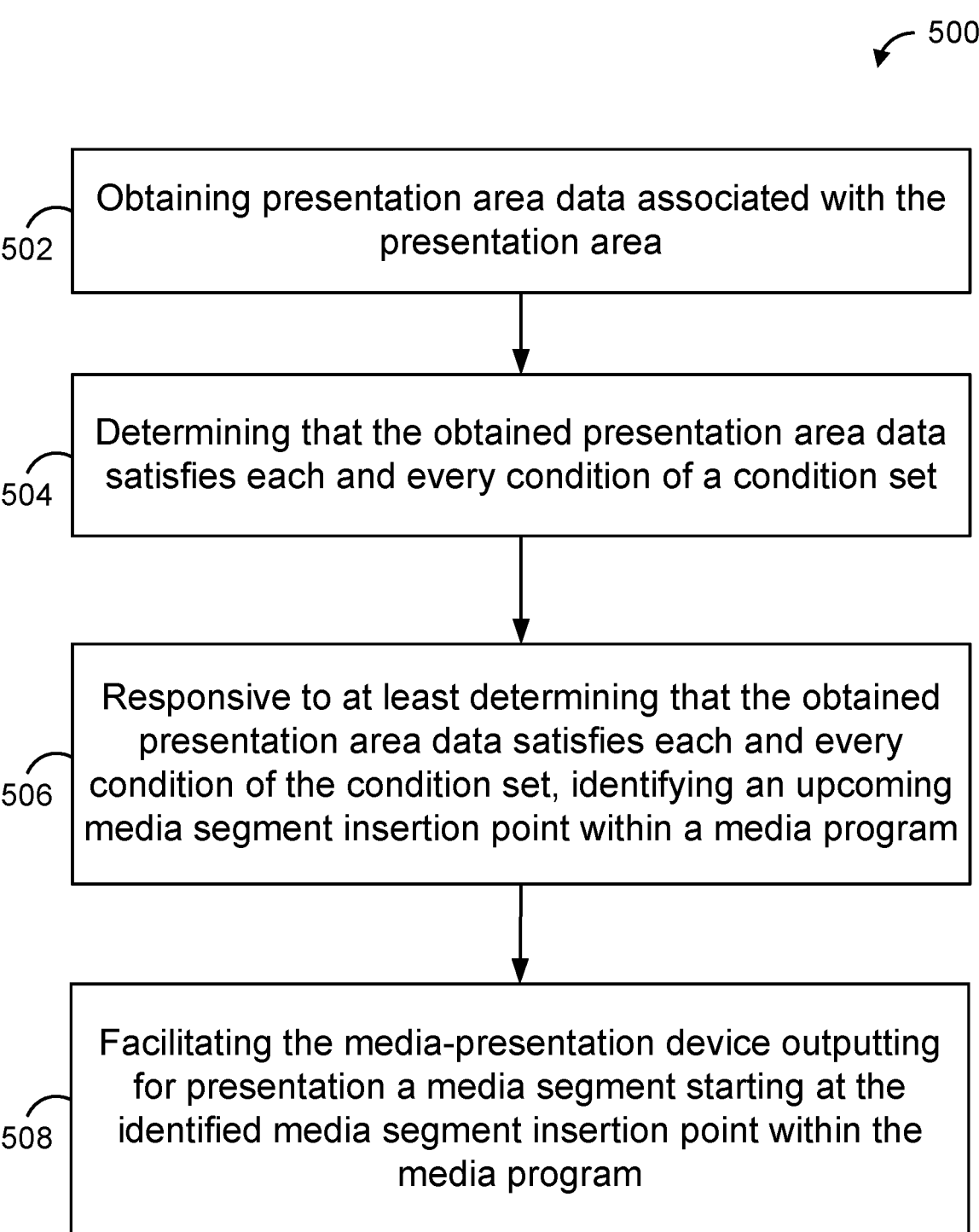

500

502  Obtaining presentation area data associated with the presentation area

504  Determining that the obtained presentation area data satisfies each and every condition of a condition set 506  Responsive to at least determining that the obtained presentation area data satisfies each and every condition of the condition set, identifying an upcoming media segment insertion point within a media program 508  Facilitating the media-presentation device outputting for presentation a media segment starting at the identified media segment insertion point within the media program

Figure 5

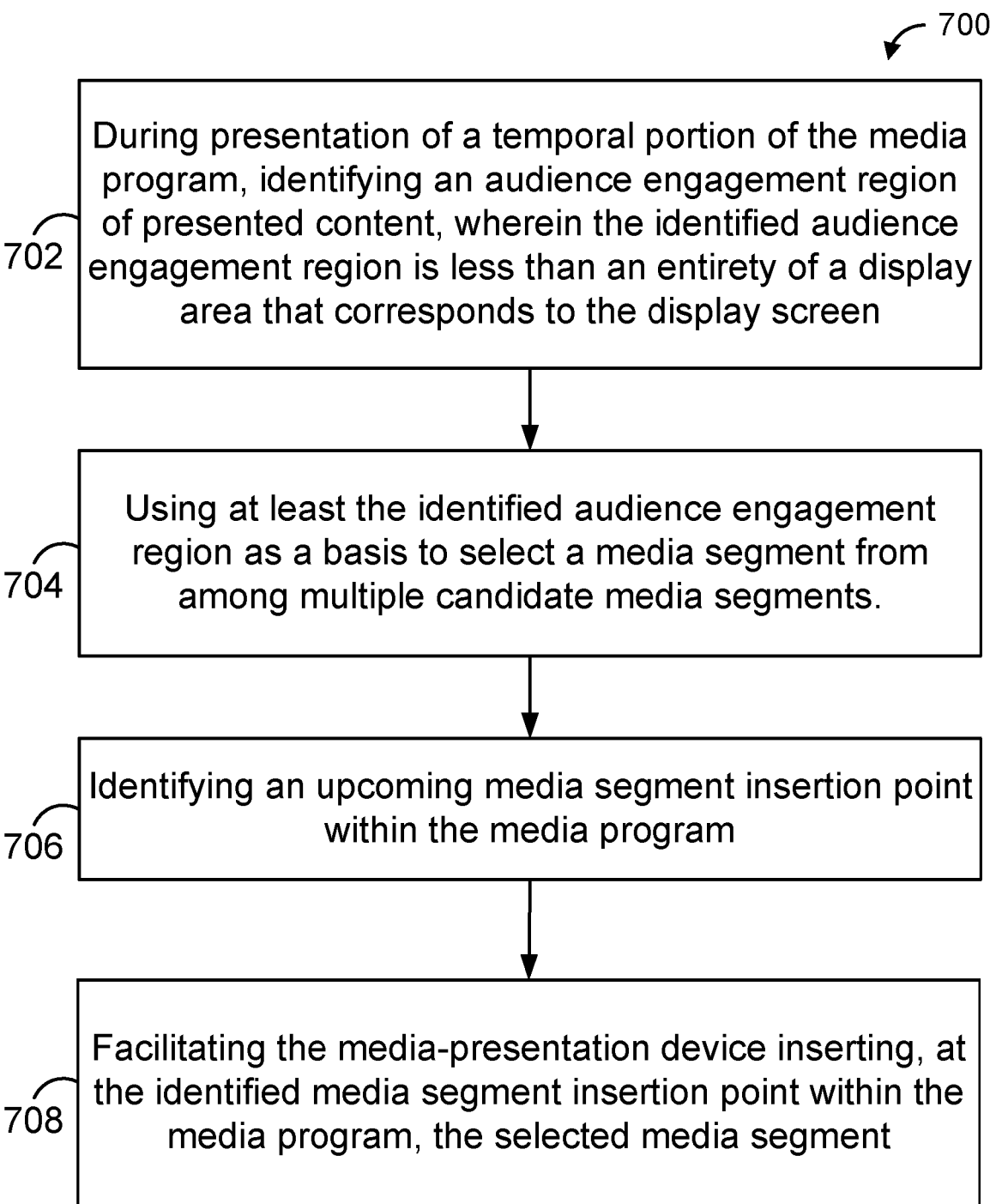

700

During presentation of a temporal portion of the media program, identifying an audience engagement region of presented content, wherein the identified audience engagement region is less than an entirety of a display area that corresponds to the display screen

702

Using at least the identified audience engagement region as a basis to select a media segment from among multiple candidate media segments.

704

Identifying an upcoming media segment insertion point within the media program

706

Facilitating the media-presentation device inserting, at the identified media segment insertion point within the media program, the selected media segment

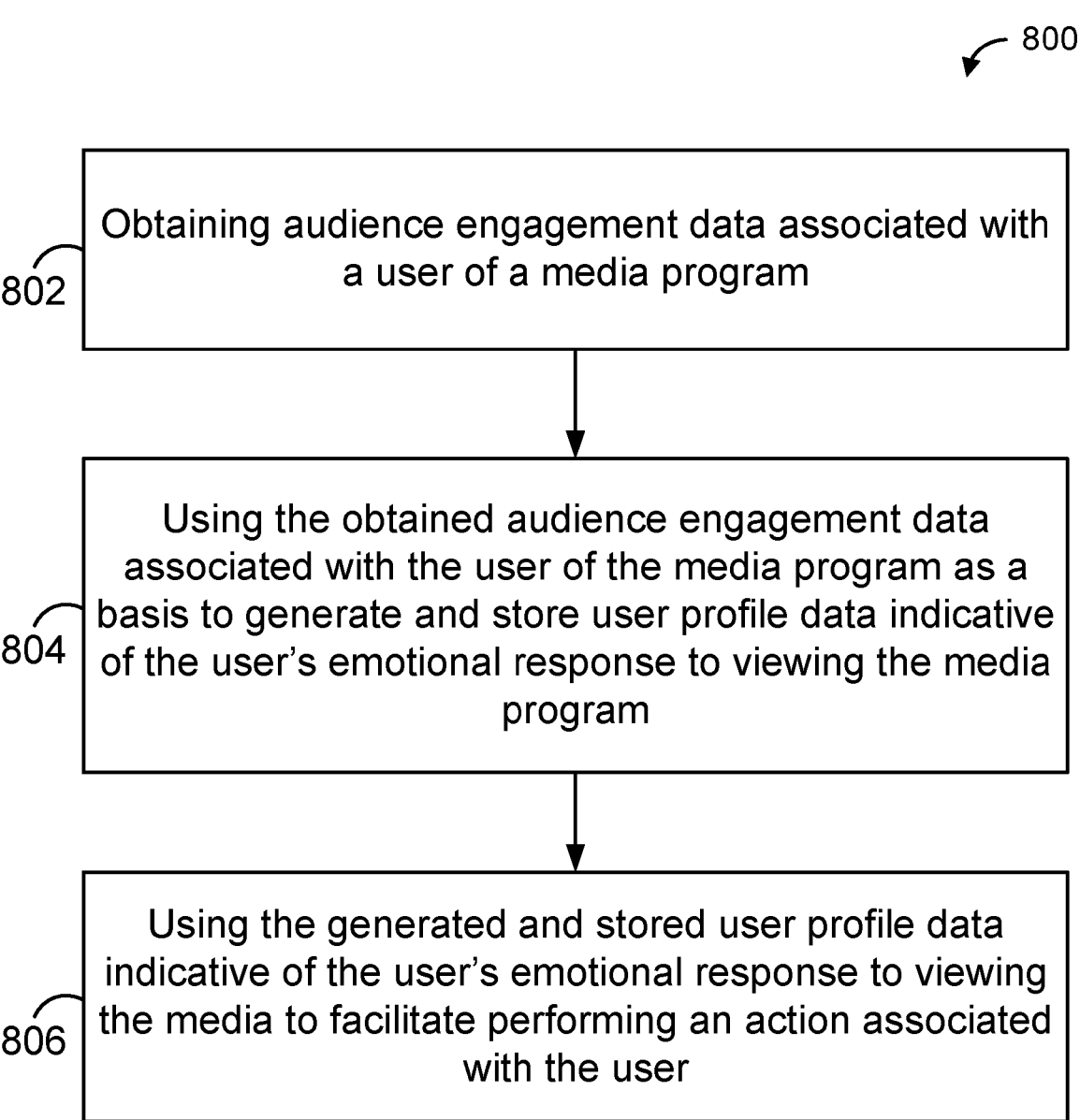

800

802   Obtaining audience engagement data associated with a user of a media program 804   Using the obtained audience engagement data associated with the user of the media program as a basis to generate and store user profile data indicative of the user's emotional response to viewing the media program 806   Using the generated and stored user profile data indicative of the user's emotional response to viewing the media to facilitate performing an action associated with the user

Figure 8

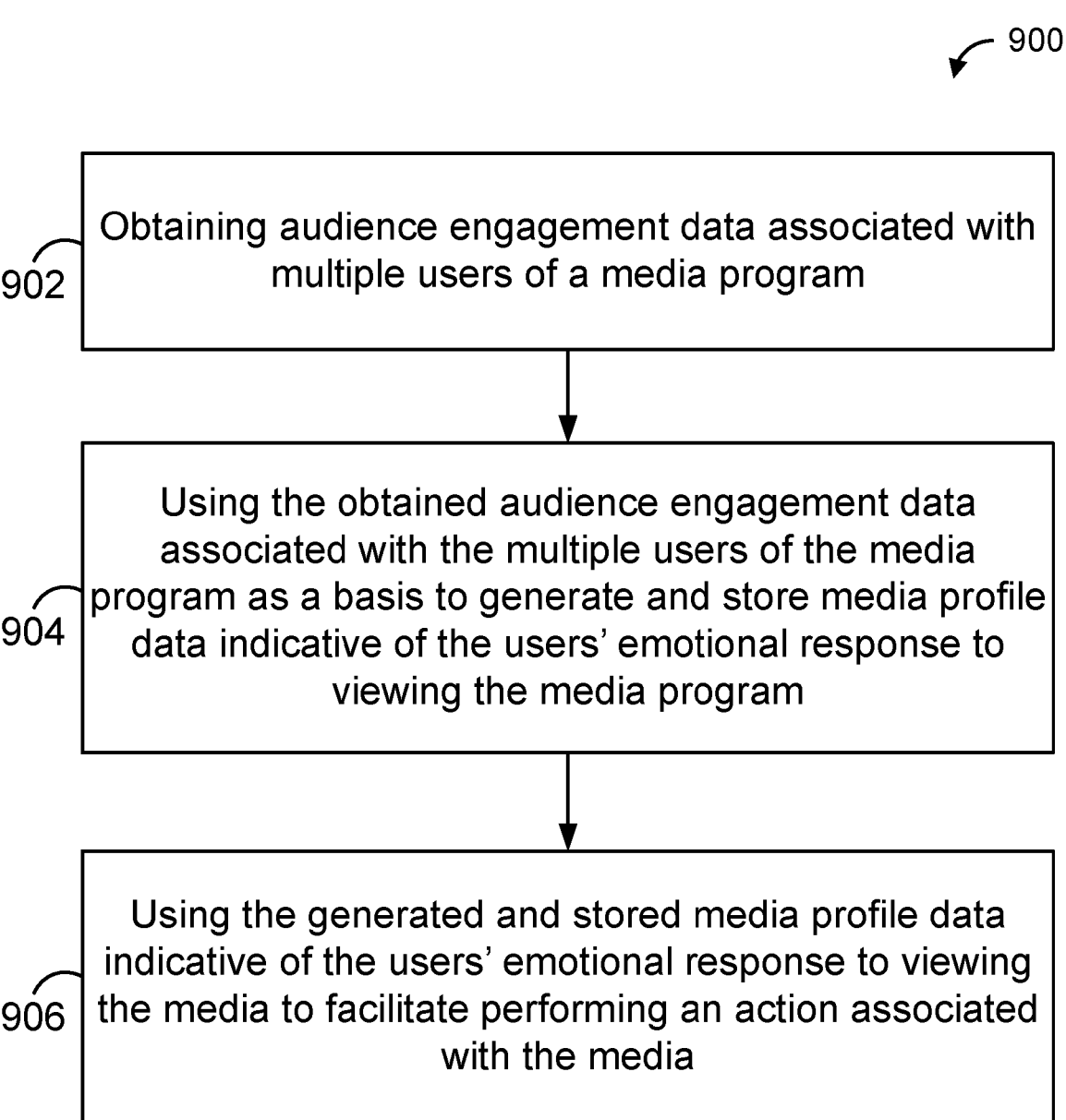

900

902  Obtaining audience engagement data associated with multiple users of a media program 904  Using the obtained audience engagement data associated with the multiple users of the media program as a basis to generate and store media profile data indicative of the users' emotional response to viewing the media program 906  Using the generated and stored media profile data indicative of the users' emotional response to viewing the media to facilitate performing an action associated with the media

Figure 9

MEDIA SYSTEM WITH PRESENTATION AREA DATA ANALYSIS AND SEGMENT INSERTION FEATURE

RELATED DISCLOSURE

This disclosure is a continuation-in-part of U.S. patent application Ser. No. 18/340,811 filed on Jun. 23, 2023, which is hereby incorporated by reference herein in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method is for use in connection with a media-presentation device presenting a media program via a display screen of the media-presentation device, the method including: (i) during presentation of a temporal portion of the media program, identifying an audience engagement region of presented content, wherein the identified audience engagement region is less than an entirety of a display area that corresponds to the display screen; (ii) using at least the identified audience engagement region as a basis to select a media segment from among multiple candidate media segments; (iii) identifying an upcoming media segment insertion point within the media program; and (iv) facilitating the media-presentation device inserting, at the identified media segment insertion point within the media program, the selected media segment.

In another aspect, an example computing system is disclosed. The computing system includes a processor and a non-transitory computer-readable storage medium having stored thereon program instructions that upon execution by the processor, cause the computing system to perform a set of acts for use in connection with a media-presentation device presenting a media program via a display screen of the media-presentation device, the set of acts including: (i) during presentation of a temporal portion of the media program, identifying an audience engagement region of presented content, wherein the identified audience engagement region is less than an entirety of a display area that corresponds to the display screen; (ii) using at least the identified audience engagement region as a basis to select a media segment from among multiple candidate media segments; (iii) identifying an upcoming media segment insertion point within the media program; and (iv) facilitating the media-presentation device inserting, at the identified media segment insertion point within the media program, the selected media segment.

In another aspect, an example non-transitory computer-readable medium is disclosed. The computer-readable medium has stored thereon program instructions that upon execution by a processor, cause a computing system to perform a set of acts for use in connection with a media-presentation device presenting a media program via a display screen of the media-presentation device, the set of acts including: (i) during presentation of a temporal portion of the media program, identifying an audience engagement region of presented content, wherein the identified audience engagement region is less than an entirety of a display area that corresponds to the display screen; (ii) using at least the identified audience engagement region as a basis to select a media segment from among multiple candidate media segments; (iii) identifying an upcoming media segment insertion point within the media program; and (iv) facilitating the media-presentation device inserting, at the identified media segment insertion point within the media program, the selected media segment.

BRIEF DESCRIPTION OF THE DRAWINGS

FIG. 5 is a flow chart of an example method.

FIG. 7 is a flow chart of another example method.

FIG. 8 is a flow chart of another example method.

FIG. 9 is a flow chart of another example method.

DETAILED DESCRIPTION

I. Overview

Figure 1:
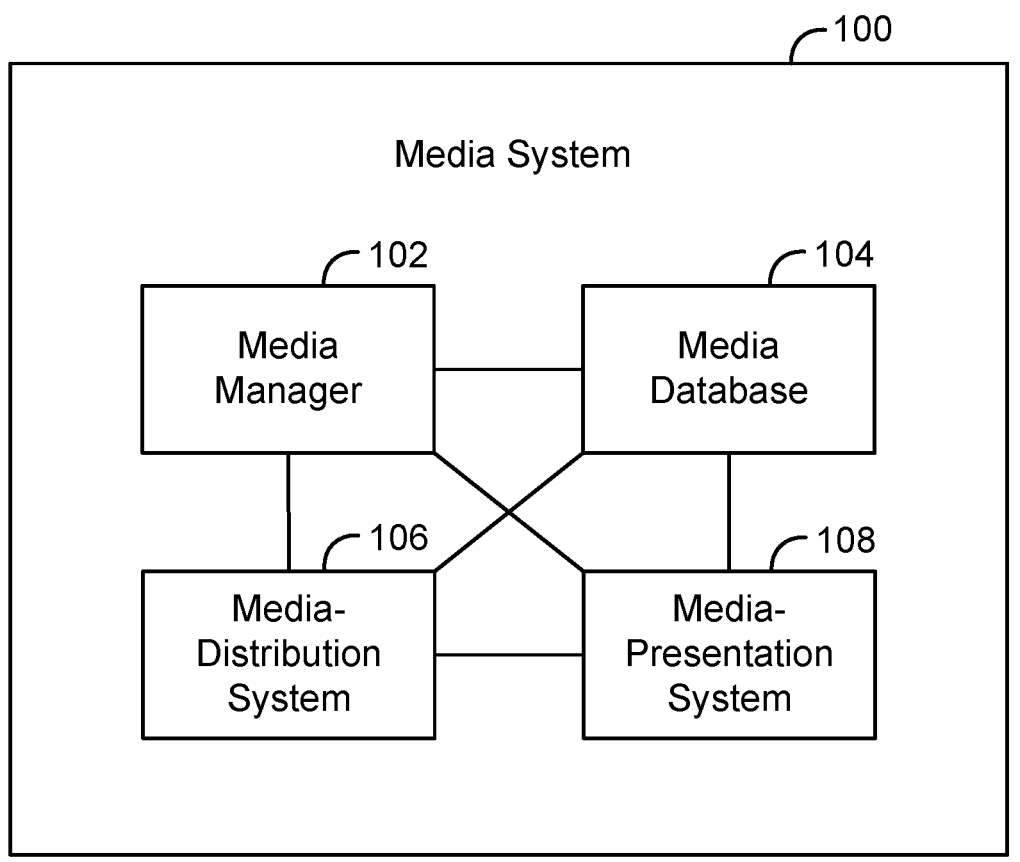
FIG. 1 is a simplified block diagram of an example media system in which various described principles can be implemented.

In the context of a media system, a media manager can obtain media (e.g., a movie or television show) from a media database and can transmit the obtained media to a media-distribution system, which in turn can transmit the media to a media-presentation device (e.g., a television), such that the media-presentation device can output the media for presentation to an audience. In some cases, before the media gets transmitted to the media-presentation device, the media manager can insert an advertisement into the media, such that that advertisement can be transmitted to the media-presentation device and presented to the audience as well.

In this context, advertisers generally seek to maximize the effectives of such media-based advertisements. But for a variety of reasons, such as there being many different types of audience situations that might need to be accounted for, advertisers often fall short of this goal. Indeed, advertisers often end up spending significant money and resources on advertisements that do not provide a sufficient return on their investment. In one aspect, the disclosed techniques provide technological solutions help provide improvements in these and other situations.

According to the present disclosure, in one aspect, a media system can obtain presentation area data associated with a presentation area of a media-presentation system, and can use the obtained presentation area data for various purposes. For example, based on the obtained presentation area data having certain characteristics (i.e., indicating the existence of a particular audience-related situation), the media system can responsively perform one or more actions to facilitate inserting a media segment into a media program, such as by responsively selecting a media segment to insert and/or by responsively identifying an insertion point for the media segment to be inserted into.

The obtained presentation area data can include data obtained directly from a camera, radar, wearable or other type of sensor, or another device, or the obtained presentation area data can be data derived from that data. There can be various types of presentation area data associated with the presentation area. For example, presentation area data can include audience data associated with one or more people in the presentation area. For instance, the audience data can include a people count indicating a number of people in the presentation area, or can include one or more user profile identifiers each associated with a respective person in the presentation area. As another example, presentation area data can include audience engagement data, which can indicate an extent of engagement and/or an emotional response of one or more people in the presentation area, with respect to media presented by the media-presentation device. There can also be various types of audience engagement data. For example, the audience engagement data could indicate an extent to which the body, face, and/or eye gaze of a person is oriented and/or directed towards the media-presentation device, an extent to which a person is moving, an extent to which a person is using a device other than the media-presentation device, an extent to which a person is eating or drinking, an extent to which a person is engaging in interpersonal activity (e.g., talking to another person or hugging another person), and/or an extent to which a person is experiencing an emotional response to the media, among numerous other possibilities, each of which may relate to the extent of the person's engagement, which hence which might impact the decision about when and whether to insert an advertisement, or perhaps how much to spend on such an advertisement.

After the media system obtains presentation area data, the media system can determine that the obtained presentation area data satisfies each and every condition of a condition set and can responsively identify an upcoming media segment insertion point within a media program. The media system can then facilitate the media-presentation device outputting for presentation a media segment starting at the identified media segment insertion point within the media program. As part of this, the media system can use the obtained presentation area data to select the advertisement or other media segment.

Among other benefits, this can enable advertisers or other media providers to specify the particular audience situation in which they want to have an advertisement inserted into the media program. Thus, for example, consider a first example condition set that includes a first condition that there are two people in the presentation area, a second condition that one person is an adult women, a third condition that one person is a child, a fourth condition that the woman and the child are speaking to each other, and a fifth condition that both people have been generally stationary for at least thirty minutes. In this situation, responsive to the media system determining that these conditions are satisfied, the media system could select and then insert an appropriately targeted advertisement for that audience in that specific situation.

In some cases, this advertisement selection process can involve providing the obtained presentation area data to a media segment bidding system, in which advertisers or others could bid on purchasing advertisement or media segment insertion rights in various audience situations. For example, a given advertiser could submit a bid to insert an advertisement specifically in the situation where the conditions of a given condition set are met (so as to reach a given type of audience). In practice, this could be done on a larger scale where many advertisers could interface with the system to submit bids in connection with many different types of audience situations.

The disclosure also provides other related concepts and features. For example, in another aspect, disclosed is a media system that, in the context of presenting a media program, identifies an audience engagement region of the presented content (e.g., an upper left portion of a display area, where the viewer's eyes are focused) and uses at least the identified audience engagement region as a basis to select an advertisement (or another type of media segment), which can then be inserted into the media program. In practice, this can allow the media system to select and then insert an advertisement that has an audience engagement region that corresponds to an audience engagement region of the media program. For example, in the case where the audience engagement region of the presented content is an upper left portion of a display area, where the viewer's eyes are focused, the media system could select an advertisement that also similarly has an audience engagement region that is an upper left portion of a display area (e.g., where the advertisement starts out with motion/activity in the upper left portion of the display area). The result can be that the user has a more seamless and pleasing transition from the media program to the advertisement, as the viewer tends to be focusing on the upper left portion of the media segment (before the advertisement is inserted) and of the inserted advertisement (after it is inserted).

The disclosure also provides many other related concepts and features, such as ones related to using area-presentation data to generate/modify user profiles and/or media profiles, which can be used to facilitate selecting and inserting advertisements and other types of media and/or to facilitate making media recommendations to users, among other things.

These and related examples and operations will now be described in greater detail.

II. Example Architecture

A. Media System

FIG. 1 is a simplified block diagram of an example media system 100. Generally, the media system 100 can perform operations related to media. Media can include a video component and/or an audio component. For context, there can be various examples of media. For instance, media can be or include a media program such as a movie or a television show, an advertisement, or a portion or combination thereof, among numerous other possibilities.

In some instances, media can be made up one or more segments. For example, in the case where the media is a media program, the media program can be made up of multiple segments, each representing a scene of the media program. In various other examples, a segment can be a smaller or larger portion of the media. In some cases, a media program can include one or more advertisements embedded therein. In such cases, each advertisement may be considered its own segment, perhaps among other segments of the media program.

Media can be represented by media data, which can be generated, stored, and/or organized in various ways and according to various formats and/or protocols, using any related techniques now known or later discovered. For example, the media can be generated by using a camera, a microphone, and/or other equipment to capture or record a live-action event. In other examples, the media can be synthetically generated (e.g., an advertisement could be generated/adjusted to include the same number of people with roughly the same age as those who are in a viewing area ready to view the advertisement), such as by using any related media generation techniques now known or later discovered.

As noted above, media data can also be stored and/or organized in various ways. For example, the media data can be stored and organized as a Multimedia Database Management System (MDMS) and/or in various digital file formats, such as the MPEG-4 format, among numerous other possibilities.

The media data can represent the media by specifying various properties of the media, such as video properties (e.g., luminance, brightness, and/or chrominance values), audio properties, and/or derivatives thereof. In some instances, the media data can be used to generate the represented media. But in other instances, the media data can be a fingerprint or signature of the media, which represents the media and/or certain characteristics of the media and which can be used for various purposes (e.g., to identify the media or characteristics thereof), but which is not sufficient at least on its own to generate the represented media.

In some instances, media can include metadata associated with the video and/or audio component. In the case where the media includes video and audio, the audio may generally be intended to be presented in sync together with the video. To help facilitate this, the media data can include metadata that associates portions of the video with corresponding portions of the audio. For example, the metadata can associate a given frame or frames of video with a corresponding portion of audio. In some cases, audio can be organized into one or more different channels or tracks, each of which can be selectively turned on or off, or otherwise controlled.

Returning back to the media system 100, this can include various components, such as a media manager 102, a media database 104, a media-distribution system 106, and/or a media-presentation system 108. The media system 100 can also include one or more connection mechanisms that connect various components within the media system 100. For example, the media system 100 can include the connection mechanisms represented by lines connecting components of the media system 100, as shown in FIG. 1.

In this disclosure, the term "connection mechanism" means a mechanism that connects and facilitates communication between two or more devices, systems, other entities, and/or components thereof. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, a communication (e.g., a transmission or receipt of data) can be a direct or indirect communication.

Figure 2:
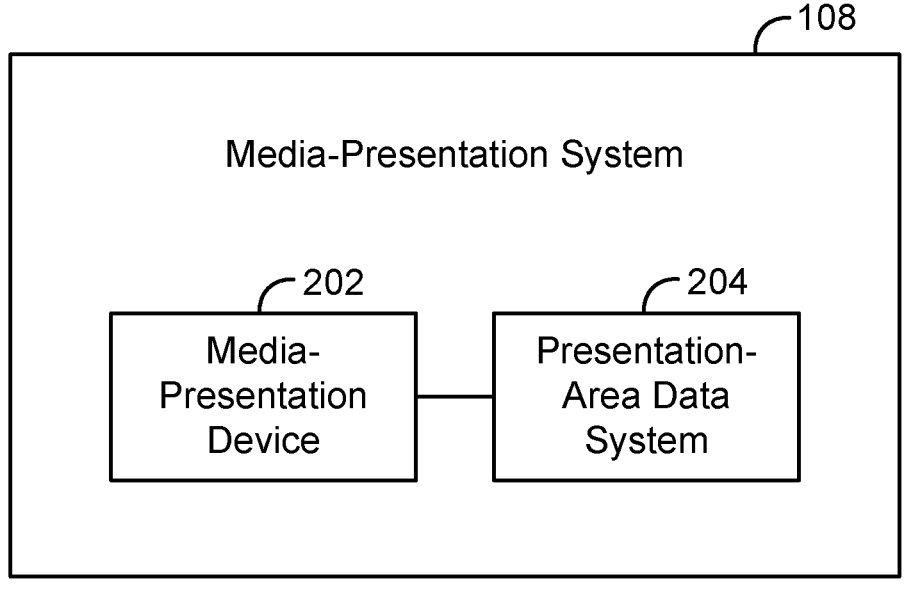
FIG. 2 is a simplified block diagram of an example media-presentation system in which various described principles can be implemented.

FIG. 2 is a simplified block diagram of an example media-presentation system 108. The media-presentation system 108 can include various components, such as a media-presentation device 202 and/or a presentation-area data system 204.

The media-presentation device 202 can take various forms. For example, the media-presentation device 202 can take the form of a television, a sound speaker, a streaming media player, and/or a set-top box, among numerous other possibilities. In practice, one or more of these can be integrated with another. For instance, in one example, a media-presentation device 202 can take the form of a television with an integrated sound speaker component and an integrated streaming media player component.

The media-presentation system 108 can also include one or more connection mechanisms that connect various components within the media-presentation system 108. For example, the media-presentation system 108 can include the connection mechanism represented by the line connecting components of the media-presentation system 108, as shown in FIG. 2.

Returning back to FIG. 1, generally, the media manager 102 can obtain media from the media database 104, and can transmit the obtained media to the media-distribution system 106, which in turn can transmit the media to the media-presentation device 202, such that the media-presentation device 202 can output the media for presentation to an end-user.

The media manager 102 can obtain media in various ways, such as by selecting media based on user input and retrieving it from the media database 104. In some examples, the media-presentation device 202 can receive such input from a user via a user interface, and can then transmit the input to the media manager 102, such that the media manager 102 can use the input to make the selection.

The media manager 102 can then transmit the media to the media-distribution system 106, which in turn can transmit the media to the media-presentation device 202. The media-distribution system 106 can transmit the media to the media-presentation device 202 in various ways. For example, the media-distribution system 106 can transmit the media on one or more channels (sometimes referred to as stations or feeds). As such, the media-distribution system 106 can be associated with a single channel media distributor or a multi-channel media distributor such as a multi-channel video program distributor (MVPD).

The media-distribution system 106 and its means of transmission of media on the channel to the media-presentation device 202 can take various forms. By way of example, the media-distribution system 106 can be or include a cable-television head-end that is associated with a cable-television provider and that transmits the media on the channel to the media-presentation device 202 through hybrid fiber/coaxial cable connections. As another example, the media-distribution system 106 can be or include a satellite-television head-end that is associated with a satellite-television provider and that transmits the media on the channel to the media-presentation device 202 through a satellite transmission. As yet another example, the media-distribution system 106 can be or include a television-broadcast station that is associated with a television-broadcast provider and that transmits the media on the channel through a terrestrial over-the-air interface to the media-presentation device 202. And as yet another example, the media-distribution system 106 can be an Internet-based distribution system that transmits the media using a media streaming-characteristic service or the like to the media-presentation device 202. In these and other examples, the media-distribution system 106 can transmit the media in the form of an analog or digital broadcast stream representing the media.

The media-presentation device 202 can then receive the media from the media-distribution system 106. In one example, the media-presentation device 202 can select (e.g., by tuning to) a channel from among multiple available channels, perhaps based on input received via a user interface, such that the media-presentation device 202 can receive media on the selected channel.

After the media-presentation device 202 receives the media from the media-distribution system 106, the media-presentation device 202 can output the media for presentation. The media-presentation device 202 can output media for presentation in various ways. For example, in the case where the media-presentation device 202 is a television, outputting the media for presentation can involve the television outputting the media via a user interface (e.g., a display screen and/or a sound speaker), such that it can be presented to an end-user. As another example, in the case where the media-presentation device 202 is a media streaming player, outputting the media for presentation can involve the media streaming player outputting the media via a communication interface (e.g., an HDMI interface), such that it can be received by a television and in turn output by the television for presentation to an end-user.

In the context of the media-presentation device 202 presenting media, the media-presentation device 202 and/or the presented media can have an associated presentation area, in which one or more people can view and/or listen to presented media. As one example, in the case where the media-presentation device 202 is a television in a living room, the presentation area can be the area of the living room where people can view video being presented on a display screen of the television and where people can hear the corresponding audio being presented through sound speakers of the television. In some cases, a presentation area can include at least a portion of one or more other rooms as well. For example, in the case where the living room has a nearby kitchen from which people can also view and/or listen to the presented media, the presentation area can also include at least a portion of that room too. Many other configurations are possible as well and as such, in connection with the given media-presentation device 202, the associated presentation area can have various different shapes, sizes, dimensions, etc.

Returning back to FIG. 2, the presentation-area data system 204 can perform operations related to obtaining presentation area data. For example, the presentation-area data system 204 can be or include a smart home device, Internet of Things (IoT) device, wearable device (e.g., worn by a person in the presentation area), or similar type of device that can obtain data associated with the presentation area (which itself is associated with the media-presentation device 202, as discussed above). For example, the presentation-area data system 204 can be or include a camera, a radar (e.g., a millimeter wave radar), a microphone, a motion sensor, a temperature sensor, a humidity sensor, a light sensor, and/or a physiological and/or biometric data sensor, among numerous other possibilities. Such devices could be placed in various locations, orientations, etc. perhaps depending on the type of data that they are configured to obtain. For example, a camera or radar can be located in or just outside the presentation area and oriented towards at least a portion of the presentation area, a microphone can be located in or near the presentation area, a motion sensor can be located in or just outside the presentation area and oriented towards at least a portion of the presentation area, and a wearable device could worn by a person in the presentation area, and thus located in the presentation area as well.

The presentation-area data system 204 can also include one or more connection mechanisms that connect various components within the presentation-area data system 204. In some cases, the presentation-area data system 204 can include additional devices, such as a smart home or IoT hub device, router, smart phone or other mobile device, etc., that facilitate communication among these and/or other devices.

Generally, the media system 100 can use the obtained presentation area data for various purposes. For example, based on the obtained presentation area data having certain characteristics (i.e., indicating the existence of a particular audience-related situation), the media system 100 can responsively perform one or more actions to facilitate inserting a media segment into a media program. In some examples, this could involve the media system 100 using the obtained presentation area data as a basis to select a media segment (e.g., an advertisement) that is specially targeted to the audience in the presentation area, and/or to identify an insertion point at which the selected media segment (or perhaps a different media segment) should be inserted, such that the media system 100 can then carry out such an insertion.

Figure 3:
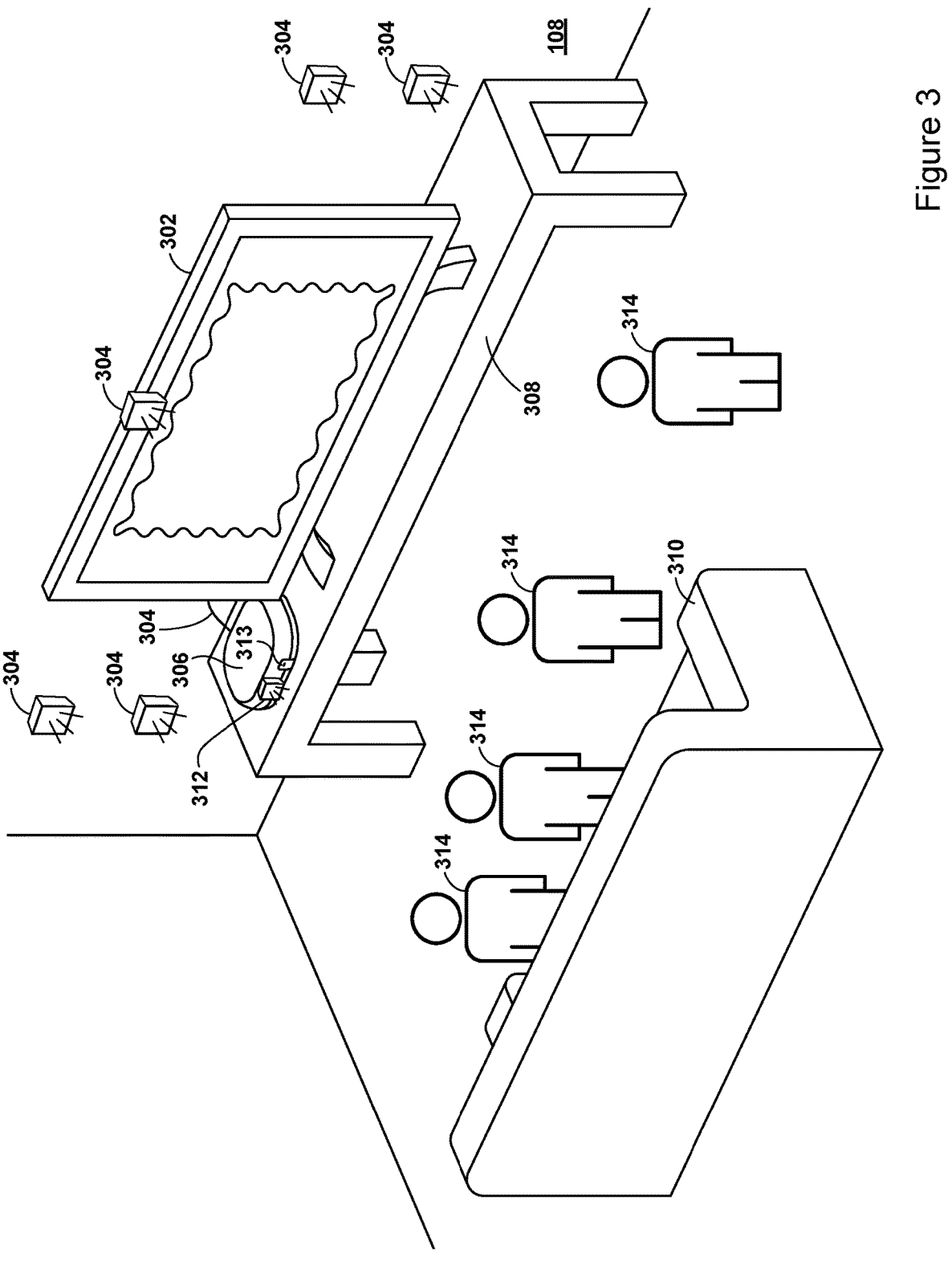
FIG. 3 is a perspective view of an example media-presentation system in which various described principles can be implemented.

FIG. 3 is a perspective view of an example media-presentation system 108, according to one example configuration with a few of the above-described devices and components. As shown, the media-presentation system 108 includes a television 302, speakers 304, and a streaming media player 306, all positioned on top of or above a table 308. The television 302 is configured to present video and the speakers 304 are configured to present audio. The presented media (i.e., the presented video and audio) is presented in a presentation area that can generally be considered to be the area near and around sofa 310. The streaming media player 306 includes a camera 312 positioned and oriented towards the presentation area, and a microphone 313 located near the presentation area. Several people 314 are located in the presentation area, such that they can view/listen to the presented media. While in the presentation area, the people 314 are also within a field of view of the camera 312 and within range of the microphone 313. The streaming media player 306 can also include or be connected to one or more IoT devices, sensors, etc. (not shown). It should be noted that FIG. 3 is provided as just one example configuration. Many other systems, devices, and/or components could be included as well and many other configurations could also be possible.

In some instances, the media system 100 and/or components thereof can include multiple instances of at least some of the described components. The media system 100 and/or components thereof can take the form of a computing system, an example of which is described below.

B. Computing System

Figure 4:
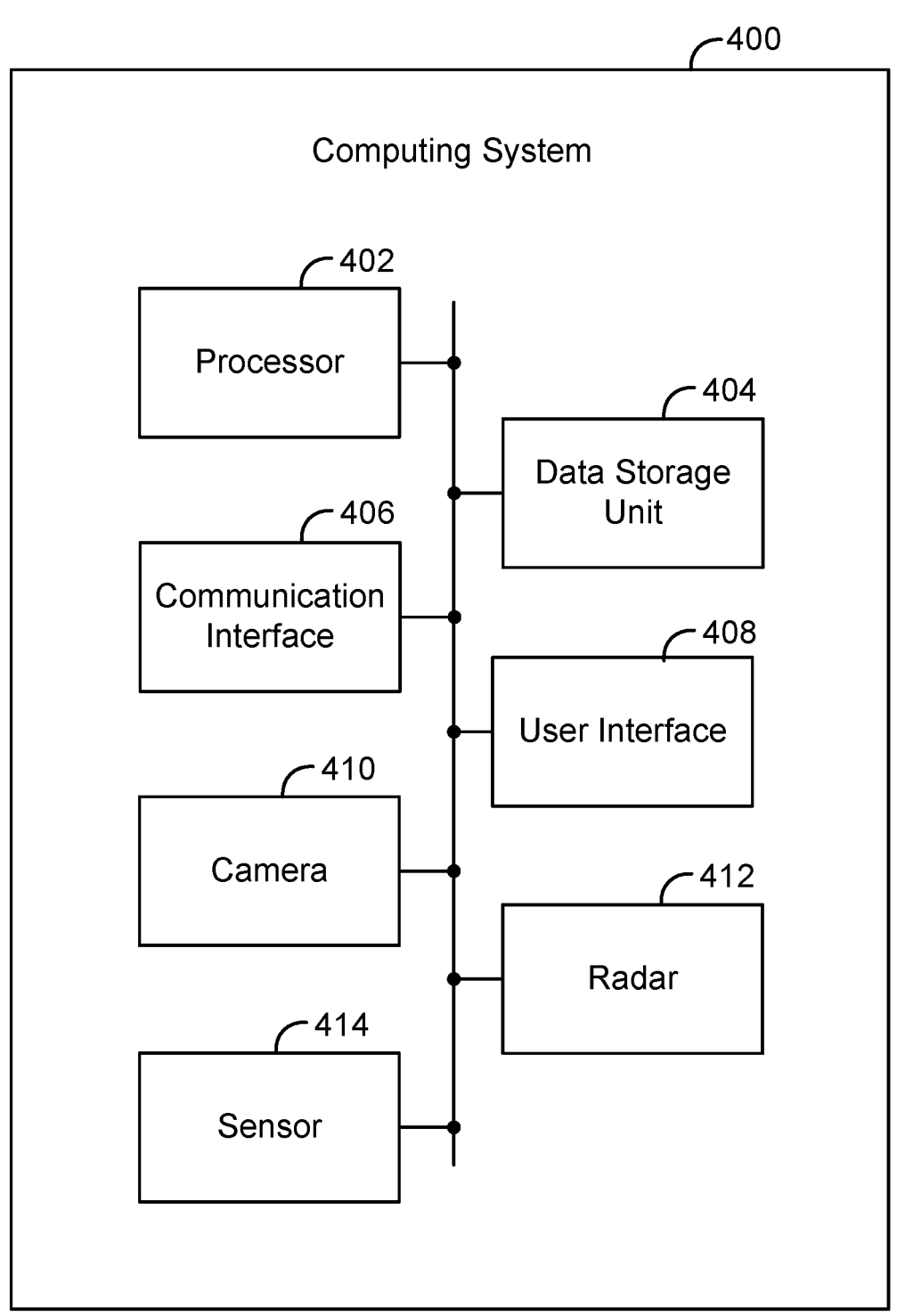
FIG. 4 is a simplified block diagram of an example computing system in which various described principles can be implemented.

FIG. 4 is a simplified block diagram of an example computing system 400. The computing system 400 can be configured to perform and/or can perform various operations, such as the operations described in this disclosure. The computing system 400 can include various components, such as a processor 402, a data storage unit 404, a communication interface 406, a user interface 408, a camera 410, a radar 412 and/or a sensor 414.

The processor 402 can be or include a general-purpose processor (e.g., a microprocessor) and/or a special-purpose processor (e.g., a digital signal processor). The processor 402 can execute program instructions included in the data storage unit 404 as described below.

The data storage unit 404 can be or include one or more volatile, non-volatile, removable, and/or non-removable storage components, such as magnetic, optical, and/or flash storage, and/or can be integrated in whole or in part with the processor 402. Further, the data storage unit 404 can be or include a non-transitory computer-readable storage medium, having stored thereon program instructions (e.g., compiled or non-compiled program logic and/or machine code) that, upon execution by the processor 402, cause the computing system 400 and/or another computing system to perform one or more operations, such as the operations described in this disclosure. These program instructions can define, and/or be part of, a discrete software application.

In some instances, the computing system 400 can execute program instructions in response to receiving an input, such as an input received via the communication interface 406 and/or the user interface 408. The data storage unit 404 can also store other data, such as any of the data described in this disclosure.

The communication interface 406 can allow the computing system 400 to connect with and/or communicate with another entity according to one or more protocols. Therefore, the computing system 400 can transmit data to, and/or receive data from, one or more other entities according to one or more protocols. In one example, the communication interface 406 can be or include a wired interface, such as an Ethernet interface or a High-Definition Multimedia Interface (HDMI). In another example, the communication interface 406 can be or include a wireless interface, such as a cellular or WI-FI interface.

The user interface 408 can allow for interaction between the computing system 400 and a user of the computing system 400. As such, the user interface 408 can be or include an input component such as a keyboard, a mouse, a remote controller, a microphone, and/or a touch-sensitive panel. The user interface 408 can also be or include an output component such as a display device (which, for example, can be combined with a touch-sensitive panel) and/or a sound speaker.

The camera 410 can be or include any type of camera (e.g., a webcam) configured to capture visual data (e.g., data representing an image and/or video).

The radar 412 can be any kind of radar, such as a millimeter wave (sometimes referred to as an mmWave) radar. Generally, a radar can transmit electromagnetic wave signals that people or objects in their path reflect. By capturing the reflected signal, the radar can determine various attributes/characteristics of the person or object, such as the range, velocity, movement, angle, and/or position of the person or object, among other possibilities. A radar can include one or more transmission antenna and/or one or more receiving antenna for this purpose. In some instances, a radar can be configured to detect various types of physiological and/or biometric data, such as breathing patterns, heartrate, etc.

The sensor 414 can be or include any type of sensor configured to capture sensor data. For example, the sensor could be or include a motion sensor, a temperature sensor, a humidity sensor, a light sensor, and/or a vital sign sensor, among numerous other possibilities.

The computing system 400 can also include one or more connection mechanisms that connect various components within the computing system 400. For example, the computing system 400 can include the connection mechanisms represented by lines that connect components of the computing system 400, as shown in FIG. 4.

The computing system 400 can include one or more of the above-described components and can be configured or arranged in various ways. For example, the computing system 400 can be configured as a server and/or a client (or perhaps a cluster of servers and/or a cluster of clients) operating in one or more server-client type arrangements, such as a partially or fully cloud-based arrangement, for instance. As noted above, the media system 100 and/or components of the media system 100 can take the form of a computing system, such as the computing system 400. In some cases, some or all of these entities can take the form of a more specific type of computing system, such as a desktop or workstation computer, a laptop, a tablet, a mobile phone, a television, a set-top box, a streaming media player, a head-mountable display device (e.g., virtual-reality headset or an augmented-reality headset), and/or a wearable device (e.g., a smart watch or heart-rate monitor), among numerous other possibilities.

Although some example architecture has been provided above, the above-described components, systems, and/or other entities can be configured in various other ways as well. For example, the above-described components, systems, and/or other entities can be combined and/or split into different components, systems, and/or other entities, for instance.

III. Example Operations

The media system 100, the computing system 400, and/or components of either can be configured to perform and/or can perform various operations, such as operations for use in connection with the media-presentation device 202 and/or its associated presentation area.

A. Obtaining and Analyzing Presentation Area Data, Identifying an Insertion Point, and Facilitating Outputting/Inserting a Media Segment In one aspect of the disclosure, the media system 100 can perform operations in connection with a presentation area associated with a media-presentation device, the operations including (i) obtaining presentation area data associated with the presentation area; (ii) determining that the obtained presentation area data satisfies each and every condition of a condition set; (iii) responsive to at least determining that the obtained presentation area data satisfies each and every condition of the condition set, identifying an upcoming media segment insertion point within a media program; and (iv) facilitating the media-presentation device outputting for presentation a media segment starting at the identified media segment insertion point within the media program. These and related operations will now be described in greater detail.

To begin, the media system 100 can obtain presentation area data associated with the presentation area. In some example, the media system 100 can do this before or while the media-presentation device 202 presents media. For example, in the scenario where the media-presentation device 202 presents a television show, the media system 100 could obtain presentation area data before or while the media-presentation device 202 is presenting one or more segments of the television show.

The obtained presentation area data can include data obtained directly from a camera, radar, sensor, or another device, or the obtained presentation area data can be data derived from that data. Also, in some examples, the media system 100 obtaining presentation area data can involve the media-presentation device 202 and/or the presentation-area data system 204 obtaining the data (or data derived therefrom), whereas in other examples, the media-presentation device 202 and/or the presentation-area data system 204 can obtain and then transmit such data (or data derived therefrom) to the media manager 102 and as such, the media manager 102 can obtain presentation area data by receiving it from the media-presentation device 202 and/or the presentation-area data system 204, for example.

There can be various types of presentation area data associated with the presentation area. For example, presentation area data can include audience data associated with one or more people in the presentation area. There can be various types of audience data. For example, the audience data can include a people count indicating a number of people in the presentation area. In another example, the audience data can include one or more user profile identifiers each associated with a respective person in the presentation area.

As another example, presentation area data can include audience engagement data indicating an extent of engagement of one or more people in the presentation area, with respect to media presented by the media-presentation device 202. As such, in the case where a person is located in the presentation area, and the media-presentation device 202 is presenting a television show, the audience engagement data can indicate an extent of that person's engagement with that television show or with some specific portion thereof.

There can also be various types of audience engagement data and the audience engagement data can include and/or be based on various components, which by themselves or collectively can indicate the extent of engagement. For example, the audience engagement data could indicate an extent to which the body, face, and/or eye gaze of a person is oriented and/or directed towards the media-presentation device 202 and/or the presented media (or perhaps some specific portion thereof). In some implementations, in the case where the person's body, face, and/or eye gaze is or is relatively more oriented and/or directed towards the media-presentation device 202, this could serve as an indication that the person is or is relatively more engaged, whereas in the case where the person's body, face, and/or eye gaze is not or is relatively less oriented and/or directed towards the media-presentation device 202, this could serve as an indication that the person is not or is relatively less engaged.

As another example, the audience engagement data can indicate an extent to which a person is moving. In some implementations, in the case where the person has little to no movement, this could serve as an indication that the person is asleep and therefore not engaged. Likewise, in the case where the person is moving a lot (e.g., walking around the room or constantly switching back and forth between sitting and standing), this could serve as an indication that the person is engaged in other activities and therefore not very engaged in the media being presented. On the other hand, in the case where the person is moving somewhere in between the two extents of movement described above, this could serve as an indication that the person is generally focused on the media being presented and is therefore engaged, perhaps with a degree of engagement being based on the specific the extent of movement.

As another example, the audience engagement data can indicate an extent to which a person is using a device other than the media-presentation device 202, such as a phone, tablet, laptop, or video game system. In some implementations, the extent to which the person is using such a device can be inversely proportional to the person's extent of engagement with the media being presented. As such, in the case where the person is using a device, this could serve as an indication that the person is not engaged or has relatively less engagement. On the other hand, in the case where the person is not using a device, this could serve as an indication that the person is or is relatively more engaged. Notably though, in some implementations, in the case where the person is using the device in a manner that is associated with the media being presented (e.g., to look up information associated with the media being presented), the extent to which the person is using a mobile can instead be proportional to the person's extent of engagement with the media being presented. As such, in some cases, obtaining presentation area data can include determining whether the mobile device being used by a person in the presentation area is being used in a manner that is associated with the media being presented. This could be done in various ways, such as by comparing Internet traffic associated with the device with metadata of the media being presented or with a transcription of the audio component of the media, and detecting a threshold extent of similarity, for instance.

As another example, the audience engagement data can indicate an extent to which a person is eating or drinking. In some implementations, the extent to which the person is eating or drinking can be inversely proportional to the person's extent of engagement with the media being presented. As such, in the case where the person is eating or drinking, this could serve as an indication that the person is not engaged or has relatively less engagement. On the other hand, in the case where the person is not eating or drinking, this could serve as an indication that the person is or is relatively more engaged.

As another example, the audience engagement data can indicate an extent to which a person is speaking. In some implementations, the extent to which the person is speaking (e.g., talking on a phone or conversing with someone in the room) can be inversely proportional to the person's extent of engagement with the media being presented. As such, in the case where the person is speaking, this could serve as an indication that the person is not engaged or has relatively less engagement. On the other hand, in the case where the person is not speaking, this could serve as an indication that the person is or is relatively more engaged. Notably though, in some implementations, in the case where the person is speaking and the content of that speech is associated with the media being presented (e.g., the person is talking about a plot point), the extent to which the person is speaking can instead be proportional to the person's extent of engagement with the media being presented. As such, in some cases, obtaining presentation area data can include determining whether content of a person's speech is associated with the media being presented. This could be done in various ways, such as by using a speech to text system to convert the person's speech to text, and then comparing the text with metadata of the media being presented or with a transcription of the audio component of the media, and detecting a threshold extent of similarity, for instance.

As another example, the audience engagement data can indicate a biological and/or physiological state of a person. For example, this could include data related to a person's heart rate, blood pressure, etc. In some situations, such as in the case where the person is watching sports-related media, certain biological and/or physiological states can inform the person's extent of engagement with the media being presented. For example, in the case where the person has a high heart rate, high blood pressure, etc. this could serve as an indication that the person is engaged or has relatively more engagement. On the other hand, in the case where the person has low heart rate, low blood pressure, etc., this could serve as an indication that the person is not or is relatively less engaged.

In some instances, rather than being person-specific, the audience engagement data can be area-specific (but can still be relevant to the engagement level of one or more people in the presentation area). For example, the audience engagement data can indicate an extent of background noise in the presentation area. In some implementations, the extent of background noise (e.g., construction sounds or music being played) can be inversely proportional to one or more people's extent of engagement with the media being presented. As such, in the case where there is or is relatively more background noise, this could serve as an indication that the one or more people are not engaged or has relatively less engagement. On the other hand, in the case where there is no or relatively little background noise, this could serve as an indication that the one or more people are or are relatively more engaged.

Although several examples of audience engagement data have been discussed, it should be appreciated that there could be other types of audience engagement data as well, including for example, audience engagement data that indicates an extent of lighting, a temperature setting, and/or any other type of data that the media system 100 can obtain and which might indicate an extent of or relate in some way to audience engagement.

The media system 100 can obtain the presentation area data associated with the presentation area in various ways. In various examples, the media system 100 can use a camera, a radar, a wireless communication interface, a microphone, a motion sensor, a temperature sensor, a humidity sensor, a light sensor, and/or a physiological data sensor (e.g., a wearable device, a camera, or a radar), among numerous other possible devices, to obtain or to facilitate obtaining such data. In some cases, the media system 100 can obtain data and can process it using various data processing techniques (e.g., to identify data patterns, characteristics, or the like) to obtain the presentation area data. As such, more generally, the obtained presentation area data can include or be based on (i) visual data captured by a camera oriented towards at least a portion of the presentation area, (ii) radar data generated by a radar oriented towards at least a portion of the presentation area, (iii) Wi-Fi-based signals and reflections emitted and detected by a wireless communication interface (by way of a Wi-Fi-based presence-detection technique) (iv) audio data captured by a microphone in or near the presentation area, (v) motion data detected by a motion sensor oriented towards at least a portion of the presentation area, (vi) physiological and/or biometric data detected by a wearable device worn by a person in the presentation area, (vii) physiological and/or biometric data detected by a camera or radar oriented towards at least a portion of the presentation area, and/or (viii) sensor data captured by a sensor in or near the presentation area, among numerous other possibilities.

Additionally or alternatively, in some examples, the presentation area data can be data indicating the presence or use of a device in the presentation area. For example, the data could be data indicating that a mobile phone or other device associated with a given person has connected to an access point in a known location in or near the presentation area. As another example, the data could indicate that a mobile phone or other device has connected to the media-presentation device 202 or other component of the media system 100 in a known location, such as over a Bluetooth or other type of wireless connection. As another example, the presentation area data can be GPS data or another type of location data obtained from a mobile phone or other device associated with a given person. In other examples, the presentation area data might indicate that such a determined location has changed from one location to another (e.g., indicating that a person may have moved from one presentation area to another). In some instances, the media system 100 can also determine that a certain type of content that a person typically watches in a first presentation area is then later being presented in a second presentation area, and could use this information to infer that the person has moved from one room to another. In some examples, these various examples of data can be used, alone or in combination with other presentation area data, to determine or confirm the presence of one or more people within the presentation area.

The media system 100 can obtain the presentation area data associated with the presentation area in various ways using any suitable techniques now known or later discovered. In some cases, the techniques used may vary depending on the type of data being obtained. For example, in the case of audience data that includes a people count indicating a number of people in the presentation area, the media system 100 can use a camera to capture visual data representing the presentation area and/or a radar to capture radar data representing the presentation area, and can then process the visual/radar data by using any known facial/presence detection technique or the like to identify how many people are represented in the visual data. As another example, in the case of audience data that includes one or more user profile identifiers, the media system 100 can process the visual data by using any known facial recognition and matching technique, any voice recognition and matching technique, or the like, to identify not only that people are present, but specifically which people are present (e.g., by comparing query data with reference data for identified users and stored in a reference database, together with corresponding user profile data or identifiers, for instance). In this way, the media system 100 can determine user profile data (e.g., demographic data, preferences data, etc.) for a given user in the presentation area.

There can be various types of user profile data that can be obtained/determined in this context. For example, the user profile data can include demographic data that provides details about the user's age, gender, etc. As another example, the user profile data can include preference data that indicates media-related preferences for that user. For example, the preference data could include genre preference data that indicates one or more genre types (e.g., action, adventure, comedy, or romance) that the user prefers. As another example, the preference data could include actor/actress preference data that indicates one or more actors or actresses that the user prefers. There can be many other types of preference data as well, including preference data related to any aspect of media (e.g., preferences related to plot types, writers, directors, settings, art styles, release dates, budgets, ratings, and/or reviews, among numbers possibilities).

Preference data can be represented in various ways. For instance, preference data can be represented with one or more scores (e.g., from 0-100) being assigned to each of multiple different potential preferences to indicate a degree or confidence score of each one, with 0 being the lowest and 100 being the highest, as just one example. For instance, in the case where the preference data indicates genre type preferences, the preference data could indicate a score of 96 for action, a score of 82 for adventure, a score of 3 for comedy, a score of 18 for romance, and so on. As such, the score of 96 for action can indicate that the user generally has a strong preference for media content of the action genre. Similarly, the score of 82 for adventure can indicate that the user also generally has a strong preference for media content of the adventure genre, though not quite as strong as a preference as compared to the action genre. And so on for each of the other genres.

There can be other types of user profile data as well. For example, user profile data can include language preference information or media presentation history information of the user, among numerous other possibilities. In some instances, media presentation history information could indicate various user activity in connection with media and/or portions thereof. For example, user profile data could indicate which movies, television shows, or advertisements a user has watched, how often, etc. In another example, user profile data could indicate an extent to which the user has replayed or paused certain media, or a segment thereof, which might indicate a certain level of interest in that portion. In another example, user profile data can include an emotional response profile for that user, as discussed in greater detail below. Such user profile data can be obtained, stored, organized, and retrieved in various ways, such as by using any related user profile data techniques now known or later discovered. In some instances, user profile data can be obtained, stored, and/or used only after the user has provided explicit permission for such operations to be performed. Likewise, in some cases various other features and/or operations disclosed herein can be provided/performed only after the user has provided explicit permission to do so.

As another example, in the case of detecting an extent to which the body, face, and/or eye gaze of a person is oriented and/or directed towards the media-presentation device 202, the media system 100 can process visual data by using any known body or head-pose estimation technique, and/or any known eye gaze detection technique, for example.

Similarly suitable techniques could be used to obtain other examples of presentation area data. For instance, in the case of the audience engagement data indicating at extent to which a person is moving, the media system 100 can process the visual data by using any known movement detection technique, for example. Such a technique can be configured in various different ways to detect various different types of movement and related information. For example, the model might indicate an extent of movement, a speed of movement, an indication as to whether the person is sitting, standing, etc., for how long, etc. The same and similar types of related information can likewise be determined in connection with other presentation area data.

As another example, in the case of detecting an extent to which a person is using a device, eating or drinking, and/or speaking, the media system 100 can process visual data by using an object tracking and/or detection technique (i.e., to track or detect a device or to track or detect food or drink-related objects) and/or an activity detection technique to determine whether the person is performing a specific type of activity (e.g., using a device, eating/drinking, or speaking), perhaps by using a classification scheme. In some cases, the media system 100 can also process audio data to help detect this type or another type of activity. For instance, in the case of detecting an extent to which a person is speaking, the media system 100 can process audio data by using a voice identification technique and/or by comparing the audio data with reference voice fingerprints for one or more people in the presentation area, for instance. In this way, the media system 100 can distinguish between speech uttered by a person located in the room and other audio (e.g., background construction noise) that may be present in the presentation area.

Also, in some instances, it may be desirable for the media-presentation device 202 (or other component of the media system 100) to include all of the various hardware components as described in this disclosure, whereas in other instances, it may be desirable for the media-presentation device 202 to include some, but not other components. For example, in some instances, it may be desirable for the media-presentation device 202 to include a camera to be able to obtain visual data, which can indicate the position and/or orientation of a user. However, for various reasons, such as users preferring not to have a camera in their vicinity, the media-presentation device 202 can include a radar, which can obtain radar data that can also indicate the position and/or orientation of a user. As such, it may be preferably in some instances for the media-presentation device 202 to include a radar, but not a camera. The media-presentation device 202 can include various components and can be configured in various ways for other reasons as well. For example, in some instances, a camera may be better suited to gather certain type of data as compared to a radar, and vice versa. For example, a camera may be better at obtaining data indicative of a user's eye gaze, whereas a radar may be better at obtaining data related to a user's heartrate, as just one example.

In some examples, the media-presentation device 202 (or other component of the media system 100) can include a motor or other similar type of device, which a camera, radar, sensor, or other component can be mounted to, such that the media-presentation device 202 can change the position and/or orientation of the mounted component. Among other things, this could allow the media-presentation device 202 to cause a camera, radar, sensor, or other device to move in response to detecting user movement, to change its field of view as appropriate (e.g., to follow the user as they move within a room).

As noted above, various components within the media system 100 can be involved in obtaining the presentation area data. For example, the media-presentation system 108 can obtain presentation area data and can transmit it to the media manager 102. As such, in some examples, the media manager 102 can obtain the presentation area data by obtaining it from the media-presentation system 108.

After obtaining the presentation area data, the media manager 102 can determine that the obtained presentation area data satisfies each and every condition of a condition set. Then, responsive to at least determining that the obtained presentation area data satisfies each and every condition of the condition set, the media manager 102 can identify an upcoming media segment insertion point within a media program. And finally, the media manager 102 can facilitate the media-presentation device 202 outputting for presentation a media segment starting at the identified media segment insertion point within the media program.

By determining that the obtained presentation area data satisfies each and every condition of a condition set, the media manager 102 can detect various audience-related situations in connection with the presentation area, where it may be desirable to facilitate the media-presentation device 202 performing one or more responsive operations, such as operations that facilitate the media-presentation device 202 outputting for presentation an advertisement or other media segment starting at an identified media segment insertion point within the media program. Thus, based on certain audience-related situations, the media manager 102 can cause a given media segment to be inserted into the media program at a given insertion point.

The condition set can include various different types of conditions to allow for different types of media segments to be inserted in different situations. Among other benefits, this can enable advertisers or other media providers to specify the particular audience situation in which they want to have an advertisement inserted into the media program. In some instances, the conditions can be conditions that are based on the presentation area data. But the conditions can be based on other information as well, such as metadata of the media being presented. For illustration purposes, a few example condition sets will now be discussed.

A first example condition set could include a first condition that there are two people in the presentation area, a second condition that one person is an adult women, a third condition that one person is a child, a fourth condition that the woman and the child are speaking to each other, and a fifth condition that both people have been generally stationary for at least thirty minutes.

A second example condition set could include a first condition that there is one person in the presentation area, a second condition that the person is a child, a third condition that the child is standing, and a fourth condition that there is a threshold amount of background noise (e.g., above a given decibel level) in the presentation area.

A third example condition set could include a first condition that there are two people in the presentation area, a second condition that the two people are both teenagers, and a third condition that the two people are also using mobile devices.

A fourth example condition set could include a first condition that there are two people in the presentation area, a second condition that the two people are respectively associated with two user profile identifiers (e.g., for two previously identified parents in the households), a third condition that both people have an eye gaze oriented towards the media-presentation device 202, and a fourth condition that both people are speaking.

A fifth example condition set could include a first condition that there are at least ten people in the presentation area, a second condition that there is a given amount of background noise in the presentation area, and a third condition that at least half of the people are eating or drinking. For context, this could represent a situation where there is a party or large gathering and the people in the presentation area generally have limited engagement with the media being presented.

A sixth example condition set could include a first condition that there are at least two people in the presentation area and a second condition that at least two of those people have had a heartrate above a threshold heartrate level in the last thirty seconds.

A seventh example condition set could include a first condition that the media being presented is a particular movie, and a second condition that there is exactly one person in the presentation area. For context, this could represent a situation where there is a person watching a particular movie alone (e.g., as opposed to that person watching the same movie with another person, as that may alter the emotional response of the person while watching the movie).

Of course, these are just a few examples of condition sets. In practice, condition sets could have lots of different conditions and could be configured to suit a desired configuration.

In some cases, in the context of obtaining presentation area data and/or determining that the obtained presentation area data satisfies each and every condition of the condition set, the media manager 102 can employ a machine learning technique, such as one that uses a deep neural network (DNN) to train a model to use a runtime input-data set to generate an appropriate runtime output-data set. Indeed, such a model could use an input-data set that includes data such as (i) visual data captured by a camera oriented towards at least a portion of the presentation area, (ii) radar data generated by a radar oriented towards at least a portion of the presentation area, (iii) audio data captured by a microphone in or near the presentation area, (iv) motion data detected by a motion sensor oriented towards at least a portion of the presentation area, (v) physiological and/or biometric data detected by wearable device worn by a person in the presentation area, and/or by a camera or radar, or (vi) sensor data captured by a sensor in or near the presentation area, which is can use to generate an output-data set that includes one or more of the types of presentation area data discuss above and/or an indication as to whether a given condition has been met. In some cases, the model can output data in the form of a score, to indicate an extent of something. For instance, in the case where the presentation area data indicates an extent of engagement of a person, that could be represented with a value in a range from 1-100, with 100 indicating the highest level of engagement.

Notably though, before the media manager 102 uses the model for this purpose, the media manager 102 can first train the model by providing it with training input-data sets and training output-data sets. In practice, it is likely that large amounts of training data-perhaps thousands of training data sets or more-would be used to train the model as this generally helps improve the usefulness of the model. Training data can be generated in various ways, including by being manually assembled. However, in some cases, the one or more tools or techniques, including any training data gathering or organization techniques now known or later discovered, can be used to help automate or at least partially automate the process of assembling training data and/or training the model. In some cases, synthetically generated media content and data derived therefrom (e.g., video data and/or audio data extracted from the generated media content) can be used to help train the model.

After the model is trained, the media manager 102 can then provide to the model runtime input data, which the model can use to generate runtime output data. In this way, obtaining presentation area data associated with the presentation area, and/or determining that the obtained presentation area data satisfies each and every condition of a condition set can involve the media manager 102 using a trained model to perform such operations.

In this context, many different types of models can be employed, known examples of which could include a body or head-pose estimation model, an eye gaze detection model, an object detection model, an activity detection model, a movement detection model, and a voice identification model, among numerous other possibilities.

As noted above, responsive to at least determining that the obtained presentation area data satisfies each and every condition of the condition set, the media manager 102 can identify an upcoming media segment insertion point within a media program. The media manager 102 can do this in various ways. For example, this can include the media manager 102 identifying an upcoming (or perhaps the next upcoming) predefined advertisement segment insertion point within the media program. The media manager 102 could do this by analyzing metadata associated with the media program, for example, where that metadata provides time point markers indicating a predefined advertisement segment insertion point or placeholder (or perhaps the nearest upcoming one).

In another example, the media manager 102 can dynamically identify an upcoming media segment insertion point, such as by identifying an upcoming (or perhaps the next upcoming) scene-change transition point within the media program, wherein the scene-change transition point is not a predefined advertisement segment insertion point within the media program. The media manager 102 can do so by employing one or more scene-change detection techniques now known or later discovered. For example, techniques that detect threshold differences between pixel values, or averages of pixel values, can be used for this purpose. This can allow the media manager 102 to, based on a determination about a given audience situation, insert a targeted media segment at a place where insertion of an advertisement had not been previously scheduled to be inserted.

As noted above, the media manager 102 can then facilitate the media-presentation device 202 outputting for presentation a media segment starting at the identified media segment insertion point within the media program. The media manager 102 can do this in various ways. In one aspect, this can involve the media manager 102 selecting a media segment to be inserted. In some cases, the media manager 102 can use the obtained presentation area data and/or the conditions in the condition set to select the media segment. The media manager 102 can do this in various ways, such as by leveraging preexisting mapping data or the like to map given presentation area data and/or satisfied conditions of a condition set to a given media segment. In this way, the media manager 102 can select a media segment that is particularly suitable to the audience in the presentation area. For instance, in connection with each of the seven example condition sets described above, the mapping data could specify one or more advertisements that are suitable selections in situations where the conditions of the given condition set are satisfied.

In some cases, this selection process can involve providing the obtained presentation area data to a media segment bidding system, in which advertisers or others could bid on purchasing advertisement or media segment insertion rights in various audience situations. For example, a given advertiser could submit a bid to insert an advertisement specifically in the situation where the conditions of a given condition set are met (so as to reach a given type of audience). In practice, this could be done on a larger scale where many advertisers could interface with the system to submit bids in connection with many different types of audience situations. As such, in some examples, this selection process can involve providing the obtained presentation area data to an external media segment bidding system and responsively receiving an indication of a selected media segment provided by a media provider, where the media segment was selected by the media segment bidding system based on a corresponding successful bid from the media provider.

Facilitating the media-presentation device 202 outputting for presentation a media segment starting at the identified media segment insertion point within the media program can also include other operations. For example, in the case where the media program is being streamed, the media manager 102 (or the media-distribution system 106) can switch from streaming the media program, to instead streaming the selected media segment at the media segment insertion point. Then, when the media segment concludes, the media manager 102 can then switch back to and resume streaming the media program. In some situations, the media manager 102 can send an appropriate instruction to the media-presentation device 202, to facilitate the media-presentation device 202 performing the insertion itself. As such, the media-presentation device 202 could obtain the media segment and perform the same or similar type of operation to insert the media program at the appropriate time. Of course, the media manager 102 and/or media-presentation device 202 can employ any other known techniques for inserting segments into media as well. Given this, based on the obtained presentation area data having certain characteristics (i.e., indicating the existence of a particular audience-related situation), the media system 100 can responsively perform one or more actions to facilitate inserting a media segment into a media program.

In another aspect, in the context of the media-presentation device 202 presenting a media program, the media system 100 can identify an audience engagement region of the presented content (e.g., an upper left portion of a display area, where the person's eyes are focused) and can use at least the identified audience engagement region as a basis to select an advertisement (or another type of media segment), which the media-presentation device 202 can then insert into the media program. In practice, this can allow the media system 100 to select and then insert an advertisement that has an audience engagement region that corresponds to an audience engagement region of the media program. For example, in the case where the audience engagement region of the presented content is an upper left portion of a display area, where the person's eyes are focused, the media system could select an advertisement that also similarly has an audience engagement region that is an upper left portion of a display area (e.g., where the advertisement starts out with motion/activity in the upper left portion of the display area). The result can be that the person has a more seamless and pleasing transition from the media program to the advertisement, as the person may tend to be focusing on the upper left portion of the media segment (before the advertisement is inserted) and on the upper left portion of the inserted advertisement (as and perhaps after the insertion takes place). These and related operations will now be described in greater detail.

To begin, in connection with the media-presentation device 202 presenting a media program via a display screen of the media-presentation device 202, during presentation of a temporal portion of the media program, the media-presentation device 202 can identify an audience engagement region of presented content. The identified audience engagement region can be less than an entirety of a display area that corresponds to the display screen. For example, the audience engagement region can be a given quadrant of the display area (e.g., the upper left quadrant of the display area). However, the audience engagement region can be a different portion of the display area as well (perhaps a small or larger, and/or a differently positioned portion). In some examples, the audience engagement region can be rectangular-shaped, but it can also be non-rectangular-shaped as well, and it can be specified in various ways, such as by pixel coordinates to define its border, for example.

Generally, the audience engagement region of presented content represents a regional area of the portion of the media segment being displayed, that draws the person's (i.e., the viewer's) focus. For example, in the case where the temporal portion of the media program at issue is a depiction of a vehicle crashing into another vehicle, and where vehicle crash is generally contained in the upper left quadrant of the video, the upper left quadrant may constitute the audience engagement region (in that the audience is likely to be engaged in that specific region of the display area as opposed to other regions of the display area).

The media-presentation device 202 can identify the audience engagement region of the display screen in various ways. For example, the media-presentation device 202 can do so by obtaining area-presentation data and using the obtained area-presentation data as a basis to identify the audience engagement region. As a more specific example, this could involve the media-presentation device 202 obtaining eye gaze data (e.g., via a camera of the media-presentation device 202) for a person located within a presentation area associated with the media-presentation device 202, and using at least the eye gaze data as a basis to identify the audience engagement region (i.e., as the region in which the person is directing their eyes). As another example, the media-presentation device 202 can identify the audience engagement region of the display screen by analyzing the temporal portion of the presented media program and based at least on the analysis, detecting a threshold extent of motion of content within a region deemed to be the audience engagement region. With this approach, the media-presentation device 202 can apply one or more video analysis techniques now know or later discovered, such as a known technique for detecting motion within a region of a frame, or a technique for detecting an area of interest within a given region of video. In some example, the media system could train a machine learning model by proving it with video and corresponding indications of audience engagement regions, such that the trained model can then use video data as input, and can output an indication of the corresponding audience engagement region of the video.

Next, the media-presentation device 202 can use at least the identified audience engagement region as a basis to select a media segment from among multiple candidate media segments. In this way, the media-presentation device 202 can select an advertisement that is particularly suitable based on the identified audience engagement region (e.g., where the selected advertisement includes an audience engagement region that corresponds with the audience engagement region of the temporal portion of the media program). For instance, in the case where the audience engagement region is an upper left quadrant of the display area, the media-presentation device 202 can then select an advertisement that starts off with content having a focal point within that same upper left quadrant, where the person's eyes are likely to be focused.

The media-presentation device can then identify an upcoming media segment insertion point within the media program, such as in the various ways described above. In some examples identifying an upcoming media segment insertion point within the media program can involve identifying an upcoming media segment insertion point that immediately follows the temporal portion of the media program. And the media-presentation device 202 can then facilitate the media-presentation device inserting, at the identified media segment insertion point within the media program, the selected media segment, such as in the various ways described above (e.g., by outputting the advertisement starting at the identified media segment insertion point, and then resuming outputting the remainder of the media program after the advertisement is complete). The result of this can be that the person has a more seamless and pleasing transition from the media program to the advertisement, as discussed above.

In connection with one or more the examples discussed above in which an advertisement is inserted, as an alternative approach, the advertisement could be inserted in a different way and/or in a different location, such as into an advertisement placeholder of a screensaver, or an advertisement placeholder of a media selection menu. In this case, an advertisement placeholder (and therefore, the resulting inserted advertisement) can be positioned in various different areas within the screen saver or the menu. For instance, the advertisement could be positioned in an initial start-up or splash screen, such that the user is presented with an advertisement before proceeding to a home screen of the menu where the user can navigate through various media-related options. As another option, a given screen of the menu could include at least some distinct regions, including a first region that presents media items, or publisher channels, as various selectable options, and a second region that presents the advertisement, perhaps together with corresponding text or graphics, depending on certain information, such as the user's viewing history as it pertains to the media item being promoted by the advertisement. For instance, next to the advertisement, the menu could present text such as "Continue Watching . . . " or "You Might Also Be Interested In XYZ," where XYZ may identify a promoted media item that the user has watched, or perhaps a given genre, actor/actress name, etc.

Also, in some example, the advertisement can be an advertisement for a media item and can include or be associated with metadata indicating the media item and/or information that can be used to obtain the media item. For instance, the advertisement can include metadata in the form of URL or other type of link that points to a data storage unit where the media item is stored, such that the media-presentation device 202 can stream or otherwise obtain the media item. In some instances, in response to the user selecting such an advertisement, the media-presentation device 202 can obtain and present that particular media item. Also, in some examples, the fact that a person selected the advertisement can be an indication that the advertisement was actually effective and/or relevant to that person, and as such, in some examples, the event of the selection may be recorded (e.g., as part of the person's user profile) and considered in connection with selecting advertisements in this context the future.

As discussed above, the media system 100 can use presentation area data for various purposes, such as to facilitate the selection and/or insertion of an advertisement or another media segment into media. However, the media system 100 can use presentation area data for other purposes as well. For example, the media system 100 can use presentation area data as a basis to configure a setting of the media-presentation device 202 or another component of the media system 100. As one example, the media system 100 can use the presentation area data as a basis to change a brightness or language setting on a television, based on the preference of a person who has a user profile that indicates such a preference.

C. Additional Features Related to Emotional Response Data

As noted above, in some instances, audience engagement data can be or include emotional response data that indicates an emotional response of one or more audience members, in connection with viewing one or more portions of media. For example, emotional response data could indicate that a given person is associated with one or more emotions, such as happiness, sadness, fear, anger, surprise, and/or disgust, among numerous other possibilities, in connection with viewing a given portion of media. In practice, there could be lots of different types of emotions that could be considered in this context.

The media system 100 can obtain such emotional response data in various ways, such as by obtaining other presentation area data and using at least that obtained presentation area data as a basis to determine corresponding emotional response data. For example, this could involve the media system 100 system obtaining visual data captured from a camera, and analyzing the visual data (e.g., by applying facial-based emotion identifying techniques now known or later discovered) to determine corresponding emotional response data. As another example, this could involve the media system 100 obtaining (e.g., using a radar, or a sensor on a wearable device) physiological and/or biometric data, such as heartrate or breathing pattern data, and analyzing the data to determine corresponding emotional response data. In practice, the media system 100 can obtain a variety of different data associated with a given person, which can be analyzed collectively for the purpose of obtaining emotional response data for that person.

Emotional response data associated with a person and/or media can be represented in various ways. For instance, the emotional response data can be represented in the form of an emotional response feature vector, with a given score (e.g., from 0-100) being assigned to each of multiple different emotions, to indicate a degree or confidence score of each one, with 0 being the lowest and 100 being the highest, as just one example. For instance, for a given person and corresponding media, the emotional response feature vector could indicate a score of 91 for happiness, a score of 0 for sadness, a score of 3 for fear, and so on. As such, the score of 91 for happiness can indicate that the person, in the context of viewing the media, is associated with a high degree of happiness. Similarly, the score of 0 for sadness can indicate that the person, in the context of viewing the media, is associated with a low or non-existent degree of sadness, and so on for each of the other features in the vector.

In some instances, a machine learning model can be trained and used to generate such emotional response data. For example, a model can be trained by providing it with training data that includes various area-presentation data together with a corresponding emotional response feature vector. Then, in runtime, area presentation area data can be provided to the model, which it can use to generate a corresponding emotional response feature vector.

As noted above, the media system 100 can obtain emotional response data for a given person, in connection with a given portion of media. In practice, the media system 100 can obtain emotional response data, which can itself include metadata associating as given portion of the emotional response data with a corresponding portion of media (such as by associating a given set of emotional response data with a corresponding time stamp or time-specific period of the media). This can allow the emotional response data to indicate changes in the person's emotional response over time (e.g., on a scene-by-scene basis).

The media system 100 can use emotional response data to establish or update aspects of a user profile. In one example, the media system 100 can do this by considering that person's emotional response data in the aggregate and determining one or more trends that the media system 100 can store in the form of a component of a user profile for that person. For instance, in the case where a user routinely exhibits certain emotions in response to a given type of media, the media system 100 can generate or modify the user's profile to include emotional response data that indicates this.

In another example, the media system 100 can use emotional response data to establish or update aspects of a media profile. In one example, the media system 100 can do this by considering for various people consuming the media, the people's respective emotional response data in the aggregate and by determining one or more trends that the media system 100 can store in the form of a component of a media profile (perhaps along with other metadata relating to the media). For instance, in the case where users routinely exhibits certain emotions in response to the media, the media system

100 can generate or modify the media's profile to include emotional response data that indicates this.

The media system 100 can use emotional response data for various purposes. For example, the media system 100 can use such data for the various purposes described above in the context of using obtained area presentation area. For example, the media system 100 can obtain emotional response data and use that as a basis to identify an upcoming media segment insertion point, such that the media system 100 can dynamically identify a media insertion point that follows immediately or soon after a person experiences a particular emotion or set of emotions. In this way, the media system 100 can dynamically insert an advertisement responsive to determining that the person is experiencing one or more particular emotions. Similarly, the media system 100 can use the obtained emotional response data as a basis to select an advertisement to be inserted at that insertion point. In this way, the media system 100 can dynamically select an advertisement that may be suitable for that person, in view of the person experiencing one or more particular emotions.

In other example, the media system 100 can use emotional response data in the context of generating or modifying a user profile or a media profile (e.g., as described above), which can facilitate the media system using such profiles to perform a variety of operations, such as operations related to selecting media for recommendation purposes, or operations related to providing users with potentially relevant metadata for media. Indeed, in various examples, the media system 100 could determine that for a given person, based on the person's user profile and the media profiles of one or more media programs, the person may be interested in one or more particular media programs, which the media system 100 may then recommend to the person (e.g., by presenting the person with advertisements for those media programs, or by configuring a content selection menu to highlight such recommendations).

By leveraging emotional response data in this way, in some examples, this can allow a media provider to provide media recommendations to a person while having no or a limited ability to determine which specific media items have been presented to the person. To illustrate this, consider a situation in which a first media provider provides a media streaming platform that streams media to people over multiple different media channels, including a first channel operated by that same first media provider, and also a second channel operated by a third-party media provider. For various reasons, the first media provider may be limited in its ability to identify which media items are being streamed on the second channel. Thus, as an alternative to identifying the media items being streamed, the media system 100 could instead obtain emotional response data for the person, and use that as a basis to determine media item recommendations (e.g., such that the first media provider can present the person with recommendations for media items provided by the first media provider as opposed to media items provided by the second media provider).

In another aspect, the media system 100 can use emotional response data as an additional data point in the context of a user submitting a review of a given media program. For example, in the case where the media system 100 provides a mechanism by which a user can submit a review of a media program (e.g., in the form of a rating between 1-5, with 5 being the highest), the media system 100 can associate the user's emotional response data with the review, to serve as a more detailed record of the person's experience with respect to viewing the media program. Such emotional response data could then be presented to the person in various ways via a user interface. For instance, in one example, the emotional response data could be presented as a graph, where each emotion is represented as a different color. The graph could be configured in various ways, such as with one axis representing time (spanning the duration of the media program) and the other axis representing an emotion score (e.g., from 1-100), as just one example. In some examples, various points along the timeline could be linked to corresponding positions within the media, such that a user could select a point on the graph, to cause the media system 100 to present the media program starting at that selected time point. In this way, the user could refer to the graph and easily navigate to a place in the media where the user experienced a certain emotion, for example.

In various example, in the context of the media system providing media recommendations, the media system 100 could use the person's user profile and media profiles of media programs to predict the person's emotional response to such media. In this case, for each such media program, the media system 100 could generate a graph like the ones described above and present it to that person.

D. Reporting and/or Editing System

In some instances, the media system 100 can include a reporting and/or editing system component that keeps records of the data and related operations discussed above, that generated related reports, and/or that allows a user to review, approve, reject, and/or edit various operations or results of operations. Among other things, could be used to generate various reports, such as reports showing what presentation area data was obtained in connection with which portions of media programs, perhaps on a person-by-person, or on an aggregate-type basis. In addition, this system could provide for generating certain reports and/or as part of a quality assurance process. For example, in the context of the media manager 102 obtaining presentation area data and/or determining that certain associated conditions were met, the reporting and/or editing system can provide suggested determinations, etc. that allows a user of the system to review and approve (perhaps with some user input/editing).

E. Example Methods

FIG. 5 is a flow chart illustrating an example method 500 for use in connection with a media-presentation device having an associated presentation area. The method 500 can be carried out by a media system, such as the media system 100, the media manager 102, or more generally, by a computing system, such as the computing system 400. At block 502, the method 500 includes obtaining presentation area data associated with the presentation area. At block 504, the method 500 includes determining that the obtained presentation area data satisfies each and every condition of a condition set. At block 506, the method includes responsive to at least determining that the obtained presentation area data satisfies each and every condition of the condition set, identifying an upcoming media segment insertion point within a media program. At block 508, the method includes facilitating the media-presentation device outputting for presentation a media segment starting at the identified media segment insertion point within the media program.

In some examples, the obtained presentation area data includes or is based on (i) radar data captured by a radar oriented towards at least a portion of the presentation area, (ii) visual data captured by a camera oriented towards at least a portion of the presentation area, (iii) audio data captured by a microphone in or near the presentation area, (iv) motion data detected by a motion sensor oriented towards at least a portion of the presentation area, (v) physiological and/or biological data detected by wearable device worn by a person in the presentation area, or (iv) sensor data captured by a sensor in or near the presentation area.

In some examples, the presentation area data includes audience data associated with a person in the presentation area, and wherein the audience data includes (i) a people count indicating a number of people in the presentation area, or (ii) a user profile identifier associated with a person in the presentation area.

In some examples, the presentation area data includes audience engagement data indicating an extent of engagement of one or more people in the presentation area, with respect to media presented by the media-presentation device.

In some examples, the audience engagement data (i) indicates an extent to which a body, face, and/or eye gaze of a person in the presentation area is oriented and/or directed towards media presented by the media-presentation device, (ii) indicates an extent to which a person in the presentation area is using a device other than the media-presentation device, (iii) indicates an extent to which a person in the presentation area is eating and/or drinking, (iv) indicates an extent to which a person in the presentation area is speaking, (v) indicates a physiological state of a person in the presentation area, (vi) indicates an extent of background noise in the presentation area, (vii) indicates an extent of lighting in the presentation area, or (viii) indicates an emotional response of the person.

In some examples, determining that the obtained presentation area data satisfies each and every condition of the condition set involves determining an extent to which the person is speaking about media being presented by the media-presentation device.

In some examples, the condition set include a condition that the obtained presentation area data has a predefined characteristic relative to reference presentation area data.

In some examples, identifying an upcoming media segment insertion point within the media program involves (i) identifying an upcoming predefined advertisement segment insertion point within the media program, (ii) identifying a upcoming scene-change transition point within the media program, wherein the scene-change transition point is not a predefined advertisement segment insertion point within the media program, or (iii) identifying a next upcoming scene-change transition point within the media program, wherein the scene-change transition point is not a predefined advertisement segment insertion point within the media program.

In some examples, facilitating the media-presentation device outputting for presentation the media segment starting at the identified media segment insertion point within the media program involves: (i) using the obtained presentation area data as a basis to select a media segment; and (ii) inserting the selected media segment into the media program, and transmitting the media program with the inserted media segment to the media-presentation device to be output for presentation.

In some examples, facilitating the media-presentation device outputting for presentation the media segment starting at the identified media segment insertion point within the media program involves providing the obtained presentation area data to a media segment bidding system and responsively receiving an indication of a selected media segment provided by a media provider, wherein the media segment was selected by the media segment bidding system based on a corresponding successful bid from the media provider.

Figure 6:
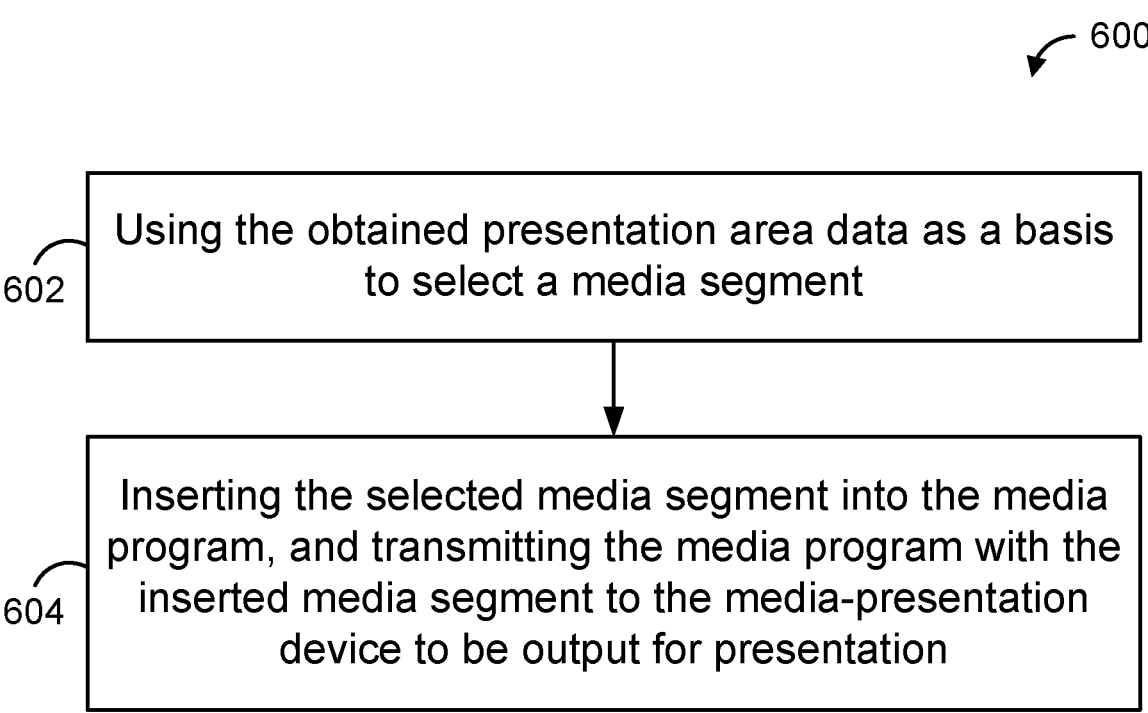
FIG. 6 is a flow chart of another example method.

FIG. 6 is a flow chart illustrating an example method 600 for facilitating a media-presentation device outputting for presentation a media segment starting at an identified media segment insertion point within a media program. The method 600 can be carried out by a media system, such as the media system 100, the media manager 102, or more generally, by a computing system, such as the computing system 400. At block 602, the method 600 includes using the obtained presentation area data as a basis to select a media segment. At block 604, the method 500 includes inserting the selected media segment into the media program, and transmitting the media program with the inserted media segment to the media-presentation device to be output for presentation.

FIG. 7 is a flow chart illustrating an example method 700 for use in connection with a media-presentation device presenting a media program via a display screen of the media-presentation device. The method 700 can be carried out by a media system, such as the media system 100, the media manager 102, or more generally, by a computing system, such as the computing system 400. At block 702, the method 700 includes during presentation of a temporal portion of the media program, identifying an audience engagement region of presented content, wherein the identified audience engagement region is less than an entirety of a display area that corresponds to the display screen. At block 704, the method 700 includes using at least the identified audience engagement region as a basis to select a media segment from among multiple candidate media segments. At block 706, the method 700 includes identifying an upcoming media segment insertion point within the media program. And at block 707, the method 700 includes facilitating the media-presentation device inserting, at the identified media segment insertion point within the media program, the selected media segment.

In some examples, identifying the audience engagement region of the display screen involves obtaining eye gaze data for a person located within a presentation area associated with the media-presentation device, and using at least the eye gaze data as a basis to identify the audience engagement region.

In some examples, obtaining eye gaze data for the person located within the presentation area associated with the media-presentation device comprises using a camera to obtain eye gaze data for the person located within the presentation area associated with the media-presentation device.

In some examples, identifying the audience engagement region of the display screen involves analyzing the temporal portion of the presented media program and based at least on the analysis, detecting a threshold extent of motion of content within a region deemed to be the audience engagement region.

In some examples, the audience engagement region is a rectangular-shaped region or the audience engagement region is a non-rectangular-shaped region. In some examples, the selected media segment is an advertisement. In some examples, the selected advertisement includes an audience engagement region that corresponds with the audience engagement region of the temporal portion of the media program.

In some examples, identifying an upcoming media segment insertion point within the media program comprises identifying an upcoming media segment insertion point that immediately follows the temporal portion of the media program.

In some examples, using at least the identified audience engagement region as the basis to select the media segment from among multiple candidate media segments includes using at least the identified audience engagement region and emotional response data as the basis to select the media segment from among multiple candidate media segments.

FIG. 8 is a flow chart illustrating an example method 800. The method 800 can be carried out by a media system, such as the media system 100, the media manager 102, or more generally, by a computing system, such as the computing system 400. At block 802, the method 800 includes obtaining audience engagement data associated with a user of a media program. At block 804, the method 800 includes using the obtained audience engagement data associated with the user of the media program as a basis to generate and store user profile data indicative of the user's emotional response to viewing the media program. At block 806, the method 800 includes using the generated and stored user profile data indicative of the user's emotional response to viewing the media to facilitate performing an action associated with the user. The action can include any one or more of the operations described in this disclosure.

FIG. 9 is a flow chart illustrating an example method 900. The method 900 can be carried out by a media system, such as the media system 100, the media manager 102, or more generally, by a computing system, such as the computing system 400. At block 902, the method 900 includes obtaining audience engagement data associated with multiple users of a media program. At block 904, the method 900 includes using the obtained audience engagement data associated with the multiple users of the media program as a basis to generate and store media profile data indicative of the users' emotional response to viewing the media program. At block 906, the method 900 includes using the generated and stored media profile data indicative of the users' emotional response to viewing the media to facilitate performing an action associated with the media. The action can include any one or more of the operations described in this disclosure.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for use in connection with a media-presentation device presenting a media program via a display screen of the media-presentation device, the method comprising:

during presentation of a temporal portion of the media program, identifying an audience engagement region of presented content, wherein the identified audience engagement region is less than an entirety of a display area that corresponds to the display screen;

using at least the identified audience engagement region as a basis to select a media segment from among multiple candidate media segments, wherein the selected media segment includes an audience engagement region that has the same location on the display screen as the identified audience engagement region of the temporal portion of the media program;

identifying an upcoming media segment insertion point within the media program; and facilitating the media-presentation device inserting, at the identified media segment insertion point within the media program, the selected media segment.

2. The method of claim 1, wherein identifying the audience engagement region of the display screen comprises:

obtaining eye gaze data for a person located within a presentation area associated with the media-presentation device, and using at least the eye gaze data as a basis to identify the audience engagement region.

3. The method of claim 2, wherein obtaining eye gaze data for the person located within the presentation area associated with the media-presentation device comprises using a camera to obtain eye gaze data for the person located within the presentation area associated with the media-presentation device.

4. The method of claim 1, wherein identifying the audience engagement region of the display screen comprises:

analyzing the temporal portion of the presented media program and based at least on the analysis, detecting a threshold extent of motion of content within a region deemed to be the audience engagement region.

5. The method of claim 1, wherein the audience engagement region is a rectangular-shaped region.

6. The method of claim 1, wherein using at least the identified audience engagement region as the basis to select the media segment from among multiple candidate media segments comprises using at least the identified audience engagement region and emotional response data as the basis to select the media segment from among multiple candidate media segments.

7. The method of claim 1, wherein the selected media segment is a selected advertisement.

8. The method of claim 1, wherein identifying an upcoming media segment insertion point within the media program comprises identifying an upcoming media segment insertion point that immediately follows the temporal portion of the media program.

9. A computing system comprising a processor and a non-transitory computer-readable storage medium having stored thereon program instructions that upon execution by the processor, cause the computing system to perform a set of acts for use in connection with a media-presentation device presenting a media program via a display screen of the media-presentation device, the set of acts comprising:

during presentation of a temporal portion of the media program, identifying an audience engagement region of presented content, wherein the identified audience engagement region is less than an entirety of a display area that corresponds to the display screen;

using at least the identified audience engagement region as a basis to select a media segment from among multiple candidate media segments, wherein the selected media segment includes an audience engagement region that has the same location on the display screen as the identified audience engagement region of the temporal portion of the media program;

identifying an upcoming media segment insertion point within the media program; and facilitating the media-presentation device inserting, at the identified media segment insertion point within the media program, the selected media segment.

10. The computing system of claim 9, wherein identifying the audience engagement region of the display screen comprises:

obtaining eye gaze data for a person located within a presentation area associated with the media-presentation device, and using at least the eye gaze data as a basis to identify the audience engagement region.

11. The computing system of claim 10 wherein obtaining eye gaze data, wherein obtaining eye gaze data for the person located within the presentation area associated with the media-presentation device comprises using a camera to obtain eye gaze data for the person located within the presentation area associated with the media-presentation device.

12. The computing system of claim 9, wherein identifying the audience engagement region of the display screen comprises:

analyzing the temporal portion of the presented media program and based at least on the analysis, detecting a threshold extent of motion of content within a region deemed to be the audience engagement region.

13. The computing system of claim 9, wherein the audience engagement region is a rectangular-shaped region.

14. The computing system of claim 9, wherein using at least the identified audience engagement region as the basis to select the media segment from among multiple candidate media segments comprises using at least the identified audience engagement region and emotional response data as the basis to select the media segment from among multiple candidate media segments.

15. The computing system of claim 9, wherein the selected media segment is a selected advertisement.

16. The computing system of claim 15, wherein identifying an upcoming media segment insertion point within the media program comprises identifying an upcoming media segment insertion point that immediately follows the temporal portion of the media program.

17. A non-transitory computer-readable storage medium having stored thereon program instructions that upon execution by a processor, cause a computing system to perform a set of acts for use in connection with a media-presentation device presenting a media program via a display screen of the media-presentation device, the set of acts comprising:

during presentation of a temporal portion of the media program, identifying an audience engagement region of presented content, wherein the identified audience engagement region is less than an entirety of a display area that corresponds to the display screen;

using at least the identified audience engagement region as a basis to select a media segment from among multiple candidate media segments, wherein the selected media segment includes an audience engagement region that has the same location on the display screen as the identified audience engagement region of the temporal portion of the media program;

identifying an upcoming media segment insertion point within the media program; and facilitating the media-presentation device inserting, at the identified media segment insertion point within the media program, the selected media segment.

18. The non-transitory computer-readable storage medium of claim 17, wherein identifying the audience engagement region of the display screen comprises:

obtaining eye gaze data for a person located within a presentation area associated with the media-presentation device, and using at least the eye gaze data as a basis to identify the audience engagement region.

\* \* \* \* \*